Sept. 26, 1961     R. R. BALAGUER     3,001,237

METHOD OF MAKING CARBON ARTICLES

Filed Dec. 31, 1956     6 Sheets-Sheet 1

Sept. 26, 1961 R. R. BALAGUER 3,001,237
METHOD OF MAKING CARBON ARTICLES
Filed Dec. 31, 1956 6 Sheets-Sheet 2
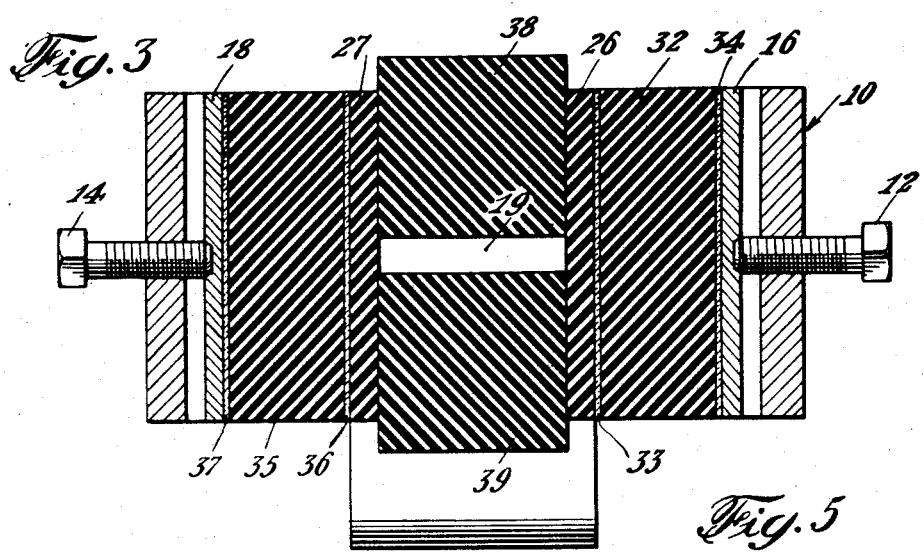
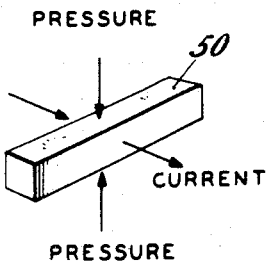
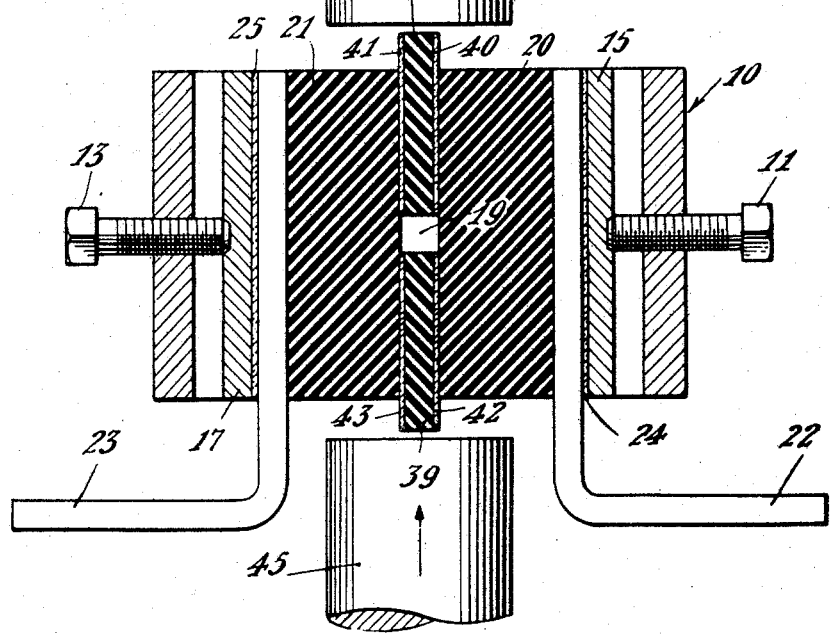

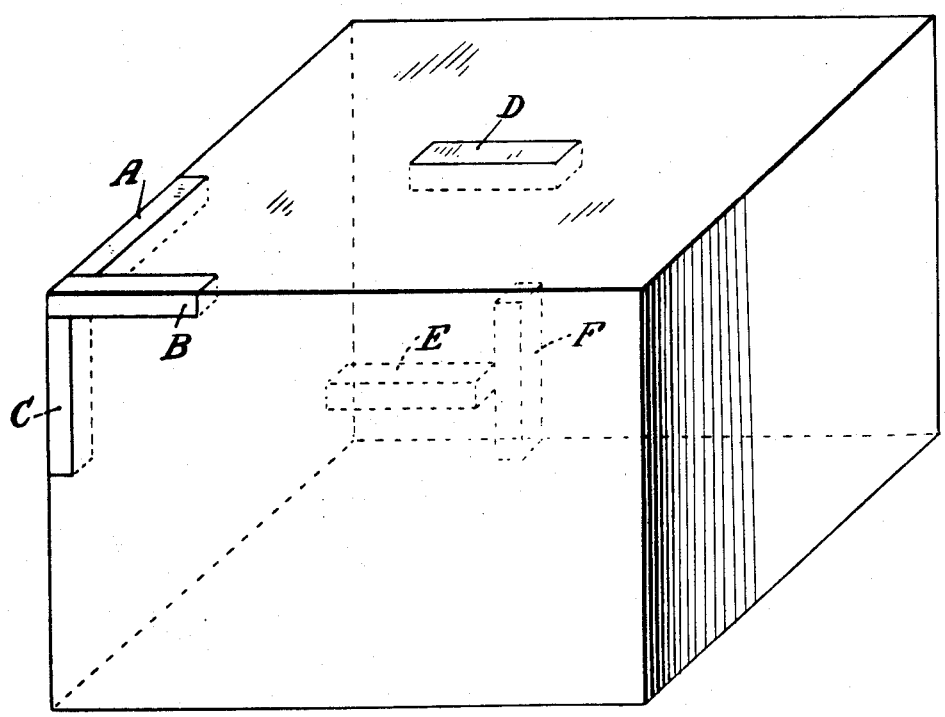

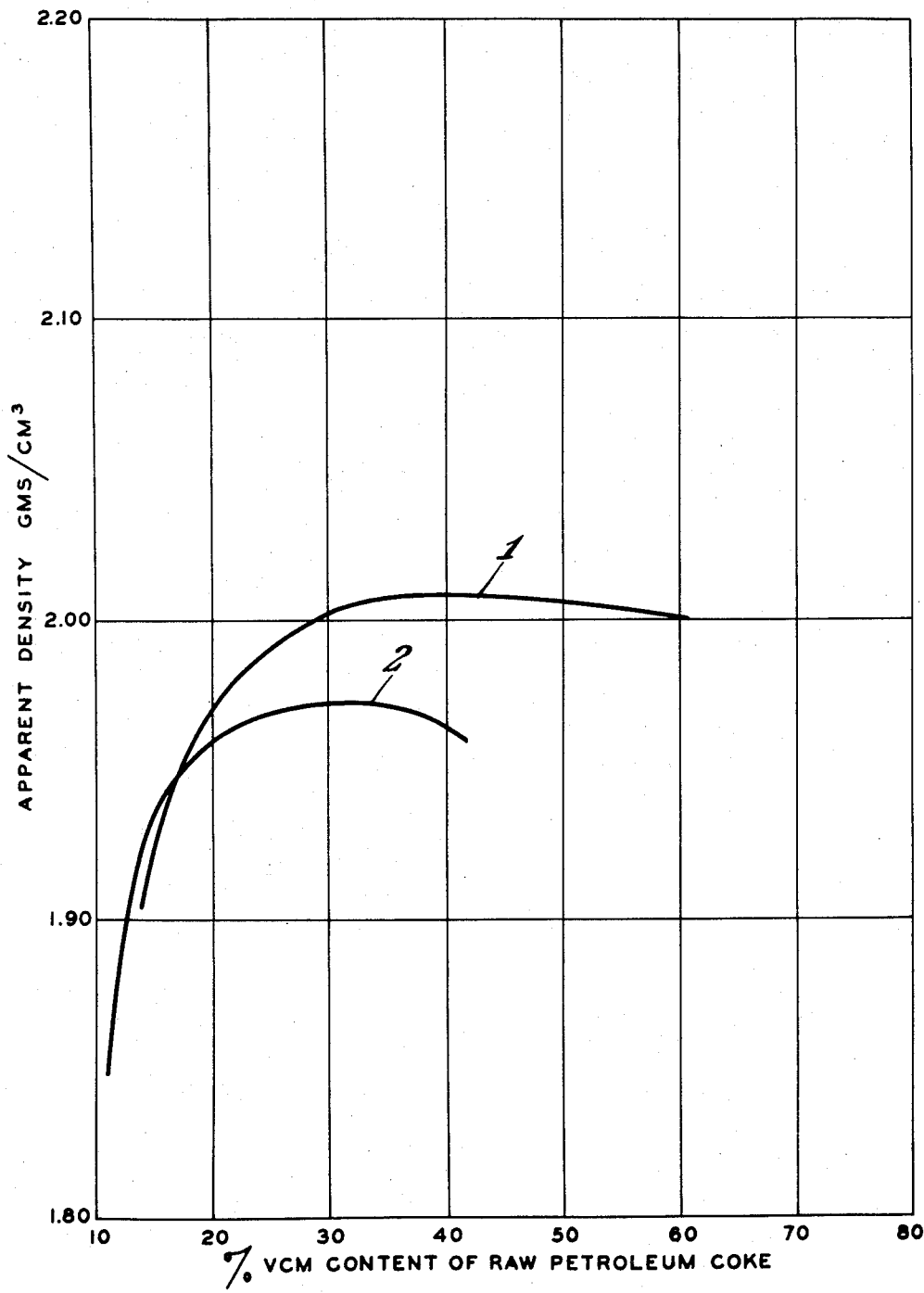

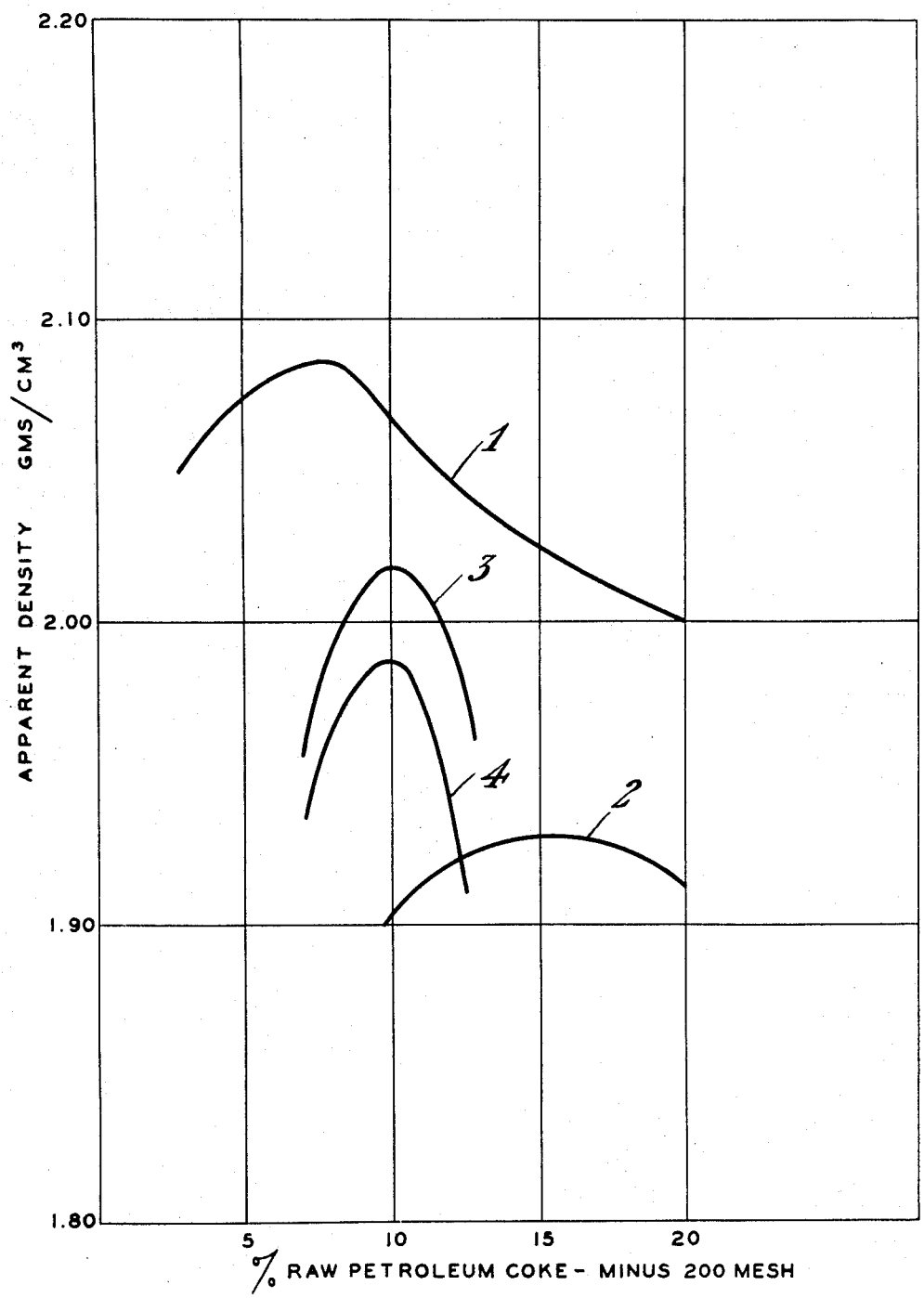

3,001,237
METHOD OF MAKING CARBON ARTICLES
Rodolfo Rodriguez Balaguer, Union de Reyes, Cuba, assignor to James D. Hedges, Havana, Cuba
Filed Dec. 31, 1956, Ser. No. 631,735
17 Claims. (Cl. 18—54.7)

The present invention relates to producing formed carbon and graphite articles and more particularly to such articles which exhibit physical characteristics such as density, electrical conductivity, permeability and mechanical strength having desired magnitudes. This application is a continuation-in-part of my copending application Serial No. 470,117, filed November 19, 1954, now abandoned which in turn is a continuation-in-part of my application Serial No. 408,551, filed February 5, 1954, now abandoned.

Various processes have heretofore been suggested and employed for producing formed carbon and graphite articles. Such processes have yielded useful articles but they have suffered from disadvantages that result in increased cost. For example, processes of the prior art have required slow heating of the articles up to the required baking temperature in order to avoid distortion, excessive porosity, and breakage. Even with precautions such as slow heating, rejects have been a significant item and these coupled with the inefficient use of electrical power or fuel and equipment entailed by baking cycles normally requiring many days, have been important cost factors. Some modified processes have been suggested which permit somewhat faster cooking, but even these have required cooking rates which are slow in relation to the size of the products. An example of such a process is set forth in U.S. Patent 2,594,226 to Shea which specifies a rate of 10–20° C. per minute for a small electrode 1½ inches in diameter.

A typical conventional process for the manufacture of carbon electrodes involves first the making of a "green" electrode. Typical raw materials are a high purity carbon, petroleum coke, and a highly aromatic binder, such as coal tar pitch. A raw material mix might consist of 4 parts of screened petroleum coke particles, 6 parts of fine petroleum coke flour, and about 3 parts of coal tar pitch as a binder. The petroleum coke is calcined before being comminuted. In addition to these raw materials, small quantities of a petroleum base oil are frequently added to the raw mixture. The raw mixture may be heated to about 150° C. while being thoroughly mixed. The mixture may then be cooled to about 100° C. and then extruded to form "green" electrodes. The "green" electrodes are placed in a gas-fired furnace and heated to an internal temperature of about 750–950° C., after which the electrodes are allowed to cool within the furnace. This baking operation may require about 15 to 50 days, with the greater portion required for heating and the remainder for cooling. Electrodes and other articles so prepared are frequently referred to in the industry as "gas-baked." After being prepared for use by certain machining operations, these carbon electrodes are ready for use in applications where a very low electrical resistivity is not necessary or desired. Such electrodes are relatively hard and fairly strong. In many cases a somewhat lower resistivity is obtained by including a portion of graphitic or semigraphitic material, such as electrically calcined anthracite coal, graphitized foundry coke, or scrap electrodes in the mix. However, when very low electrical resistivity or high resistance to thermal shock is necessary or when the extra cost of graphitized electrodes with low resistivity can be justified, the carbon electrodes are graphitized before use. To accomplish this, the cooled baked carbon electrodes are next placed in an electrical resistance furnace. The electrodes within the furnace are heated to a temperature of about 2800° C., which takes from 2 to 4 days. After heating is completed, the electrodes are allowed to cool for about 10 days. The end products are graphitic electrodes which have relatively low resistivity and high thermal shock resistance.

For many purposes, such as in the manufacture of electrodes, brushes and the like, it is frequently desirable to produce an article exhibiting as low a resistivity and as high a mechanical strength as possible. Graphitized electrodes exhibit a lower resistivity than ungraphitized baked carbon electrodes and are generally used whenever such low resistivity is desirable. Because of their lower resistivity, the electrode size required for a given current carrying capacity is smaller than in the case of ungraphitized carbon. The softness and lack of high mechanical strength of graphitized electrodes, combined with the relatively small diameter, create problems in their use for many purposes. In the case of graphite furnace electrodes, for instance, it is usual to specify a minimum acceptable transverse breaking strength of 1500 p.s.i., and the electrodes must be carefully handled in order to avoid breakage. Greater mechanical strength characteristics would be desirable in the electrode materials and particularly in the case of graphite electrodes for many purposes. There are certain specialized carbon and graphite products which exhibit such superior mechanical strength characteristics, but these products are very expensive compared to ardinary electrode material and therefore cannot be considered as substitutes. A good small graphite electrode may have a specific resistance of $3.5 \times 10^{-4}$ ohms per inch cube, while a similar amorphous carbon electrode may have a specific resistance of $13 \times 10^{-4}$ ohms per inch cube.

For certain purposes, special grades of carbon or graphite or graphite-carbon are useful because of particular physical characteristics. High strength, hardness, fine grain and lubricity are among the important factors in the selection of such specialty grades. In general, the preparation of the typical specialty grade is an expensive procedure. They are frequently made from very fine carbon or carbon and graphite flour combined with a suitable hard pitch. Before baking, they are generally compacted under high pressures in an effort to obtain the requisite strength or other characteristic in the final product. The pressure is then removed and the green carbons are baked in much the same way as carbon electrodes. Even though the final products are small, very slow baking is necessary in order to avoid the development of pores, cracks, internal weakness and distortion. Such specialty grades are generally machined into special shapes for their ultimate application.

Carbon articles formed by the processes of the prior art, just discussed, are porous by the very nature of their manufacture and are permeable to fluids to varying degrees. For many uses such permeability is disadvantageous and much time and effort have been expended to lower the permeability of carbon articles so formed. For certain applications the carbon or graphite articles are impregnated with resins to render them impermeable. The resin impregnated articles are limited in usefulness because of the limited resistance of the resins to high temperature and to chemical attack. They cannot be used where a wholly carbonaceous carbon or graphite article is required. It is also possible to decrease the permeability of wholly carbonaceous articles by so-called gas treatment or by impregnation with pitch followed by rebaking. Such treatments increase the cost of the product. Furthermore, the usefulness of such treatments is limited because of the difficulty of obtaining penetration into the interior of large pieces. Each treatment tends to close off the external pores so as to render subsequent treatments less effective.

Ordinary carbon or graphite prepared by the procedures employed for electrodes will generally have apparent densities of the order of 1.55 gms./cm.$^3$. Specialty grades made from fine flours will have apparent densities up to about 1.80 gms./cm.$^3$. The resin impregnated articles referred to above have apparent densities up to about 1.91 gms./cm.$^3$. Pitch impregnation also increases the apparent density. Commercial wholly carbonaceous products having apparent densities up to about 1.89 gms./cm.$^3$ are available and it is known that products have been produced with apparent densities up to 1.92 gms./cm.$^3$.

An important object of the invention has been to provide a novel and improved process for producing formed carbon articles from carbonaceous materials.

More particularly, it has been an object of the invention to provide a process of the above type which permits a wide latitude in choice of predetermined physical characteristics of the formed articles, which can be operated to achieve desirable and unusual combinations of physical characteristics, and which can be used in the manufacture of all types of carbon and graphite products such as electrolytic anodes, thermal electrodes, heat exchanger elements, seal rings, electrical brushes and contacts, bearings, refractory materials for industrial ovens, etc.

Another object of the invention has been to provide a process of the above type which will produce the formed carbon articles in a short time with a consequent minimization of input energy requirements and a maximization of use of the necessary equipment.

A further object of the invention has been to provide a one step process for producing formed carbon articles from carbonaceous materials, in which process the usual preforming operation is eliminated.

A further object of the invention has been to provide a process that will yield molded wholly carbonaceous articles of such predetermined shape and dimensions as to minimize machining operations required before ultimate use.

A feature of the invention has been to provide a process for producing formed and baked articles from carbonaceous materials wherein the materials are subjected to violent and rapid temperature increases, which may, in some cases, be as high as 1000° C. per minute, or even higher.

Another feature of the invention has been to provide a process for producing formed, bonded and baked articles from carbonaceous materials wherein the materials are maintained under high mechanical pressure throughout the period of heating.

Still another feature of the invention has been to provide a process for producing formed carbon articles from carbonaceous materials using only a mixture of dry powders.

A further feature of the invention has been to provide a process of the above type wherein a single apparatus may be used to form and bake the article and, if desired, to graphitize the article in a single operation.

Other and further objects, features and advantages of the invention will appear more fully from the following description of the invention.

The process in accordance with the invention is directed to the manufacture of formed and baked carbon articles from an electrically conductive comminuted carbonaceous material mixture, which mixture includes as one constituent a carbonaceous material which contains volatilizable matter and fusible matter which is susceptible to thermal decomposition to fixed carbon to bond the mixture. The material preferably consists of substances which are dry powders at room temperature, although the process can be operated with a mixture comprising a soft or liquid substance such as soft pitch or fuel oil. When dry material is used, it is preferably finely comminuted. The material should be thoroughly and intimately mixed, in proportions to be described hereinafter, so as to distribute all substances throughout the mass. The process comprises enclosing the comminuted carbonaceous material in a mold, subjecting the material within the mold to a high mechanical pressure to compress the same, and heating the material within the mold by the passage of electric current therethrough so as to produce a temperature rise therein until the material has been converted essentially into a fixed carbon article, the rate of temperature rise being sufficiently rapid to produce a rapid decomposition of the fusible carbonaceous material and the applied pressure being sufficiently high in relation to the rate of temperature rise to cause the mixture to be continually compressed and to fill the mold cavity as the decomposition proceeds, whereby a maximum proportion of the carbon content of the original material is converted into fixed carbon and the particles are bonded together into a solid mass free of cracks and fissures to yield an article of relatively high apparent density and mechanical strength and desired hardness, low gas permeability and electrical resistivity characteristics.

A notable characteristic of the product of the process of the invention is the fact that it has significantly lower permeability than articles produced from similar carbonaceous materials by prior art processes. Specificially, the permeability of an article produced by the method of the invention, having an apparent density of the same order as that of a similar article produced from similar materials by prior art processes, will have a permeability to gas of from $\frac{1}{5}$ to as little as $\frac{1}{40}$ of that of the article produced by prior art processes. The processes principally used in the prior art are gas baking processes in which a gas-fired furnace is used to heat the articles. This greatly decreased permeability is, in itself, a real advantage of the product of the invention even if no further treatment is desired. For the manufacture of completely impervious carbon materials the advantage of the low permeability of the product of the invention is apparent for, of course, fewer impregnation steps will be required to achieve complete impermeability.

The material of the invention is also characterized by freedom from cracks and fissures and by substantially predetermined shape and dimensions. As will be apparent from the discussions hereinafter, the composition of the mixture from which the carbonaceous material of the invention is formed, and the conditions under which the process is carried out, may be varied to provide desired apparent density, permeability, electrical conductivity, thermal conductivity, hardness, and mechanical strength characteristics. However, by suitable selection of carbonaceous materials and process conditions, a material may be produced within the teaching of the foregoing process in such a way that it will be characterized by unusual properties or combinations of properties such as unusually high density, or high strength and low electrical resistivity, or high hardness.

The invention will now be described in greater detail with reference to the appended drawings, in which:

FIG. 3 is a sectional view taken along the line 3—3 of FIG. 1;

FIG. 4 is a sectional view taken along the line 4—4 of FIG. 1;

FIG. 5 is a diagrammatic illustration of pressure and current directions through the mix in the oven of FIGS. 1 to 4;

FIG. 6 is a diagrammatic illustration of the location of test samples cut from large formed blocks;

FIG. 7 is a set of curves for high density products showing a typical variation of apparent density with changes in percent volatile combustible matter in one of the mix constituents;

FIG. 9 is a similar set of curves showing variations in apparent density with changes in percent composition of one of the mix constituents.

Figure 1:
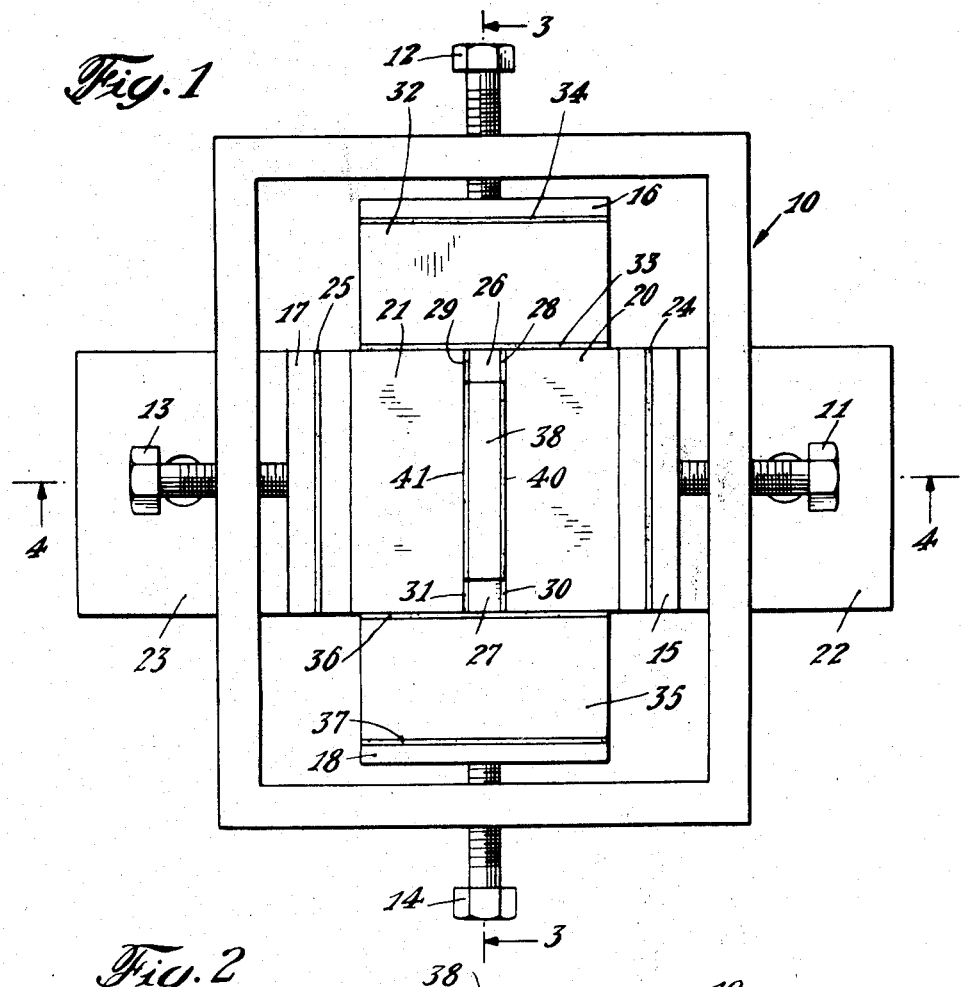
FIG. 1 is a plan view of a suitable oven and mold for use in carrying out the process of the invention.

Suitable materials for carrying out the invention are bituminous coal and electric furnace graphite in proportions of 20 to 30% coal and 70 to 80% graphite. With this combination of materials the process operates well and there is considerable latitude in the choice of process conditions to make useful products which are well bonded and have desired density, hardness, permeability and other physical characteristics as well as high conductivity. For example, the operable range of the process extends over a considerable range with regard to particle size of the materials, as well as to speed of cooking and degree of applied pressure, and a variety of product characteristics can be obtained by altering such conditions as well as percentage composition of the mixture. This does not mean that the process is not critical nor that the best products can be obtained without due regard to proper adjustment of the variables. In fact, the several process variables have been found to be interrelated in many cases so that a change in one variable will require a corresponding change in one or more other variables in order that the process will operate correctly. In general increased strength characteristics and electrical conductivity are obtained with increased cooking rates. For a given cooking rate and a given set of starting materials, there is a minimum pressure below which the process does not operate well and the product is not free of pores and fissures. Furthermore, increasing pressure would tend to increase density, conductivity and strength and decrease gas permeability at least up to a limit for each percentage mixture and degree of fineness of particle size of the constituents. Decreasing the particle size of either constituent would tend to increase the strength and hardness, but the effect on density and electrical conductivity would be dependent upon the corresponding level of other variables. In general, the apparent density would be a maximum at an optimum ratio of the two constituents for a given particle size of the graphite constituent. With a reduction in particle size, the optimum amount of graphite, in so far as apparent density is concerned, would change. The electrical resistivity would be a minimum with the largest size graphite particles.

There are similar interrelationships between other variables and other properties. In general, any change which increases the lubricity of the mix without increasing the total content of volatile combustible matter tends to improve the operation of the process at low pressures, and particularly it tends to yield denser articles at low pressures. Thus, substitution of a natural lubricating flake type of graphite in place of electric furnace graphite yields higher apparent density, and the pressure required to obtain the maximum density is lower. The difference between densities of the products obtained with the two types of graphite when cooking under low pressures is greater than can be explained from the real densities of the two types of graphite. In the case of such well lubricated mixes, however, there is sometimes a tendency for the mixture to become so fluid during the cooking cycle as to leak out of the mold. In such cases, a reduction in the proportion of volatile combustible matter containing constituent or a reduction in pressure, or both may be necessary. This is usually not harmful, because optimum properties are obtained with a smaller amount of the volatile combustible matter containing ingredient in such well lubricated mixes, and it is generally true that optimum properties can also be obtained at low levels of applied pressure. In the operation of the process the escape of gases and vapors is suppressed but it is recognized that some escape of gases and vapors, particularly hydrogen, water vapor and low molecular weight hydrocarbons must take place. With well lubricated mixes or with very small particle sizes, the escaping gases sometimes carry particles of the mix out of the oven. In such cases, and when excessive apparent fluidity of the mix occurs, it is sometimes necessary to cook at a somewhat slower rate than would otherwise be possible. However, even in such cases the cooking rate is extremely fast as compared to previously known processes. With the well lubricated mixes, not withstanding the possibility of operating at lower pressures to make desirable products or the need to alter conditions in accordance with the tendency of the mix to leak out of the mold during cooking, there are, nevertheless, relationships between permissible cooking rate and applied pressure and between optimum mechanical strength characteristics and cooking rate.

The shape characteristics of the particles comprising the mix, which will be dependent not only upon the type of material but upon the grinding procedure, will also influence both the operation of the process and the properties of the product. For example, particles ground in such a way as to have sharp and rough surfaces will have less lubricity and will also have poorer packing characteristics than particles ground in such a way that they are smooth. The optimum composition of a mixture will thus be a function not only of the type of material and particle size, but also particle shape.

If calcined petroleum coke is substituted for the electric furnace graphite, the effect is the opposite of that obtained by substitution of lubricating flake graphite. With the calcined petroleum coke, the mix is poorly lubricated. The petroleum coke has a greater coefficient of thermal expansion and a greater electrical resistivity than graphite. It is generally desirable to use higher pressures when calcined petroleum coke is substituted for the electric furnace graphite. An increased quantity of the bituminous coal can be used to impart increased lubricity to the mix during the early portion of the coking cycle but this results in greater shrinkage during coking, with consequent need for greater applied pressure so that the pressure can maintain the mix in a fully compacted condition at all times. For operation of the process with calcined petroleum coke, the design and condition of the oven with respect to its ability to withstand high pressure without deflection of the walls are highly important. The higher pressure required to achieve satisfactory compacting of the mass during cooking may be greater than the compressive strength of the product mass during the later stages of cooking when it is rigid but has not yet developed full strength, and at such time any deflection of the oven walls can result in breakage of the product. When calcined petroleum coke is used, the uniformity of heating of the product mass is also more critical than in the case of graphite, because of the greater coefficient of expansion of the petroleum coke and the product made therefrom. When the heating is being conducted in the electrical resistance type oven wherein the compressed product mass itself forms the heating element, the electrical characteristics of the oven are also more critical in the case of calcined petroleum coke than in the case of graphite. The greater electrical resistance of the coke requires a greater voltage, and hence development of arcs within the oven walls or between sections of the walls, with consequent localized heating, is more likely, and the effect of such overheating is augmented by the relatively high coefficient of expansion and greater sensitivity of the petroleum coke products to thermal shock. Difficulties are not encountered in operating the process with mixtures containing calcined petroleum coke, however, if the oven is suitable and if the process is operated with the proper adjustment of the process conditions such as percentage composition of the mix, cooking rate, and pressure. The articles made with calcined petroleum coke are harder and having lower electrical conductivity and they generally having higher compressive strength than those made form graphite.

Other carbonaceous materials which have a lower content of volatile combustible matter can also be used in place of the graphite.

Although, as previously stated, it is possible to heat the products to graphitizing temepratures in the process of the invention, it is recognized that it may be desirable to carry out graphitization, when this is needed, in a separate operation. The products of the invention may be graphitized in any of the ways known to the art, for graphitizing ordinary carbon products. Such graphitization may be practiced to improve electrical conductivity, to reduce the coefficient of thermal expansion, to remove impurities or for other reasons.

The proportion of coal that is used in the mix is dependent on the characteristics desired in the final product, but it must also be selected in accordance with the type and particle size of the other constituent of the mixture, the pressure applied during the cooking and the rate of temperature rise during cooking. It is obvious that the proporiton of coal required must to some extent be dependent upon the composition of the coal, also. The range 20 to 30% coal previously mentioned as a suitable range in a mixture made up from coal and electric furnace graphite does not represent the entire operable range of the process for these materials. Useful products have been made with less than 20% and more than 30% coal, combined with electric furnace graphite. The process is not considered limited to any particular range of compositions except that it is limited with respect to the satisfactory range of compositions for any particular set of values for the other process variables.

The coal can be replaced by other fusible carbonaceous materials which contain appreciable volatile combustible matter and which will undergo thermal decomposition to leave a residue of fixed carbon. Examples of such materials include wood, sugar, hard pitch, raw petroleum coke, and also soft pitch and the liquid residues of petroleum distillation known commercially as "Bunker C" (No. 6) fuel oil. The process is most easily operated with dry materials because of the ease of mixing such materials with simple equipment and procedures, and such dry materials are preferred. However, the process can be operated with soft or liquid materials, such as the soft pitch and fuel oil, and it is conceivable that such materials would be particularly useful if it were desired to use a pelletized raw material feed. Even when baking is carried out by making the product forming mixture the resistance element of an electrical resistance furnace, the mixtures containing the relatively small amounts of soft pitch or fuel oil that are required have sufficient electrical conductivity to pass the current required to effect the baking and yield a product. The properties of the products will, however, depend upon the type of volatile combustible matter containing material. In general, the physical strength characteristics obtained by use of material such as sugar or soft pitch or fuel oil are inferior to those obtained with material such as bituminous coal or raw petroleum coke. When coal is used, it should not be calcined. The petroleum coke should also be used raw and not calcined, and in fact petroleum cokes which contain a greater quantity of volatile combustible matter than the generally commercially available raw petroleum cokes have been found to be superior in most cases. Calcination of the coal or raw petroleum coke tends to adversely affect all properties of the final product, with the possible exception of hardness. The higher the temperature of calcination, the greater the adverse effect. Use of coal calcined at 450° C. in combination with electric furnace graphite yields products which are brittle and hard, but very weak. Use of coal calcined at 600° C. does not yield a bonded article, even though the volatile combustible matter content after calcination is as high as 11%. Contrariwise, a raw petroleum coke which contains 11% volatile combustible matter, yields a bonded article with substantial strength, although it is not as good as the product obtained with raw petroleum coke containing a higher content of volatile combustible matter such as 18, 40, or even 60% volatile combustible matter.

For optimum physical product characteristics a fine state of subdivision of the volatile combustible matter containing component is required.

While only two component mixes have been mentioned previously, it is obvious that three or more components can be combined. For example, mixtures of electric furnace graphite and calcined petroleum coke can be combined with raw petroleum coke to give a three component mix. Various combinations of properties can be secured by combining suitable material in various proportions and under various conditions.

The achievement of very high densities is most easy with a mixture which has a high degree of lubricity. For example, densities above 2.0 gms./cm.$^3$ are obtained at relatively low pressures by using natural lubricating flake graphite in large particle sizes in combination with a suitable volatile combustible matter containing material in a fine state of subdivision, and cooking under proper conditions. Such densities can also be obtained by use of a sufficiently high applied pressure and other proper conditions when the lubricity of the mixture is reduced, as by a finer state of subdivision of the lubricating flake, or by substitution of a different type of graphite. Decomposed silicon carbide has been found to approach lubricating flake in degree of lubricity, and is preferred to normal electric furnace (electrode) graphite for the particular high density application because it requires less pressure. Where purity is important, the graphite may be suitably treated for removal of impurities before it is incorporated in the mix. Likewise, petroleum coke may be similarly purified or it may be specially prepared from purified oils.

It is not necessary that all the product forming mixture consist of finely divided particles. In the case of large articles, a considerable portion of large particles may be included. Such larger particles should preferably be of the type having a very low content of volatile matter.

In carrying out the process of the invention, the carbonaceous materials, preferably graphite and bituminous coal, may be reduced to small particle sizes and are mixed together before heating. The particle sizes are preferably very small, when making small pieces as will be discussed in greater detail below. However, in achieving very high densities, larger particle sizes are preferred. The mixture is placed in a furnace or oven constructed to provide rapid temperature increases with a substantially uniform cooking temperature throughout the mass. The furnace or oven is preferably of the electrical resistance type and should be constructed so as to permit the passage of a relatively large electrical current through the mass of mix. Provision must also be made for maintaining the mix under a considerable mechanical pressure throughout the heating interval.

It has been found desirable to cause the electrical current to flow through the mix with a sufficiently high current density so that the mix temperature rises very rapidly to a relatively high value. Too slow a temperature rise, i.e., too low a temperature gradient, too low a final temperature or too low an applied pressure, may seriously impair the electrical, mechanical and density characteristics of the resultant product and, especially in the case of small formed articles, may even result in a failure of the materials to form a solid article or may result in an article which is so soft as to be virtually useless. The temperature rise need not be uniform with respect to time. In fact, in some cases the mix may be allowed to remain at substantially constant temperatures for a short time. However, when the temperature is caused to rise, from time to time, the rise should be at a rapid rate. It has been found that a generally slow temperature rise will not yield a desirable product and often will not yield a product in article form. In the case of small articles measuring ¼″ x ¼″ x 1.5″, a temperature rise of 1000° F. during the first minute, and a further 1000° F. during the next two minutes, has been used and found advantageous to the production of the best product. Even faster rates have been used with good results. In the case of larger articles, the rate of temperature rise is limited by practical considerations. The temperature attained during the baking process before the release of the pressure must be sufficiently high to effect substantially complete decomposition of the carbonaceous materials to leave a residue of fixed carbon and effect volatilization and escape of the vapors and gases resulting from such decomposition. In some embodiments of the process, the products will show electrical conductivity equal to that of commercial graphite electrodes, while at the same time they will show superior compressive and transverse strengths. By proper choice of materials and conditions, products of higher conductivity can be produced, although generally with a sacrifice in mechanical properties. If desired, a product with a lower conductivity and high mechanical strength characteristics can be achieved.

Referring now to FIGS. 1 through 4 of the drawings, there is illustrated an electrical resistance type oven which is admirably suited for carrying out the process in accordance with the invention. It should be understood, however, that a variety of other ovens or furnaces could be employed so long as they provide for rapid heating under pressure and attainment of substantially uniform temperatures throughout the product mass, at any instant. The substantial uniformity of temperature throughout the product at any time during the cooking cycle is believed essential to yield uniform product characteristics throughout the mass, and to avoid the development of fissures during the cooking cycle.

The oven comprises a frame member 10 of generally rectangular shape. While the member 10 may be formed of any strong material, it is preferably made from wrought iron or the like. The member 10 is provided with threaded holes on each side thereof adapted to receive supporting bolts 11, 12, 13 and 14. The ends of the bolts 11—14 located within the member 10 are adapted to engage plates 15—18, respectively. The plates 15—18, which might conveniently be made of wrought iron or the like, are preferably provided with recesses adapted to accommodate the ends of the bolts. The baking chamber 19 is bounded on two sides by blocks 20 and 21, respectively. The blocks 20 and 21 are preferably made from heat-resistant electrically conductive material such as amorphous carbon or graphite. These blocks could conveniently be made of a refractory carbonaceous material produced in accordance with the process of the present invention. Preferably, the material should have as low a thermal conductivity as possible consistent with the other requirements thereof. An outer surface of each of the blocks 20—21 abuts against a portion of a leg of each of L-shaped electrodes 22 and 23. The opposite surface of each of the electrodes 22 and 23 is separated from the corresponding wrought iron plates 15 and 17, respectively, by means of insulating sheets 24 and 25, respectively, which could be made from mica, asbestos or other suitable heat-resistant electrically insulating material.

Two other walls of the baking chamber 19 are formed by relatively small blocks 26 and 27, which are best shown in FIGS. 1 and 3. The blocks 26 and 27 may be formed of the same material employed for the blocks 20 and 21. Opposite vertical surfaces of the block 26 are separated from the adjacent surfaces of the blocks 20 and 21 by means of mica or other insulating sheets 28 and 29. The block 27 is similarly separated from the blocks 20 and 21 by sheets 30 and 31.

A block 32, which may be made of the same material as the blocks 20 and 21, is separated from the blocks 20, 21 and 26 by a mica or other suitable insulating sheet 33 and from the plate 16 by a similar sheet 34. A similar block 35 is separated from the blocks 20, 21 and 27 by an insulating sheet 36 and from the plate 18 by an insulating sheet 37.

The various blocks and plates referred to are held in the relative positions illustrated in the drawings by proper adjustment of the bolts 11—14. It is desirable that the structure be made as rigid as possible so that the baking chamber walls will not be deformed by the pressure exerted on the powdered material placed therein.

As will best be seen from FIGS. 3 and 4, the upper and lower walls of the baking chamber are formed by movable block or pistons 38 and 39 arranged to slide in vertical directions within the space provided between the blocks 20 and 21 and the blocks 26 and 27. The piston 38 is electrically insulated from the blocks 20 and 21 by means of sheets of mica or other suitable insulating material 40 and 41. The piston 39 is similarly insulated by sheets 42 and 43, respectively. The pistons 38 and 39 are arranged to be urged toward each other under action of any suitable mechanism such as a jack, weight and lever system, hydraulic piston, or the like. This means is indicated diagrammatically at 44 and 45 in FIG. 4.

Materials from which the oven is made need not be carbonaceous so long as they have suitable strength and electrical and chemical properties at the temperatures and under the conditions encountered. For example, the non-current carrying walls may conveniently be formed from some strong and substantially electrically non-conductive refractory material.

The material to be baked is placed in the baking chamber by removing one of the pistons 38 and 39 and placing the material in contact with the face of the other piston. The removed piston is then replaced and the mechanism indicated at 44 and 45 is actuated to compress the mix within the baking chamber to a pressure previously determined and which might be, for example, 3600 pounds per square inch. A source of electrical power providing a very high current at a very low voltage is connected to the electrodes 22 and 23 so that current will flow through a path including these electrodes, the blocks 20 and 21, and the mix located within the baking chamber 19. Extraneous current paths are eliminated by means of the various insulating sheets described above. It will be understood that these insulating sheets could largely be replaced with air gaps to similarly provide the desired insulating effect. In larger ovens, the pistons and the end walls may be laminated with a lamination separated by insulating sheets or air gaps to reduce the tendency for stray currents to pass from the product mass into these members and back again.

A diagrammatic illustration of the directions of pressure application and current flow is shown in FIG. 5, in which a block of material 50 is shown as having pressure applied in opposite directions to two opposing faces while the current flows through two other opposing faces. The construction of the oven is such that all parts of the mix within the baking chamber 19 are subjected to a uniform pressure and to a uniform current flow. This construction results in a product having substantially uniform characteristics throughout the mass. It has also been found that failure to apply the pressure uniformly or to heat the mass so as to attain substantially uniform temperature throughout the mass at any instant will cause breakage of the product and prevent repetitive production of sound articles free of fissures and with uniform product characteristics. This limits the process to methods of heating wherein heat is generated within the product mass, and eliminates the possibility of using heat transmission from the oven walls as a primary heating method except possibly in the case of very small articles. Some temperature differentiation must exist between the center and the portions just adjacent to the oven walls, depending upon type of material in the oven walls and rate of temperature rise, even though the heat is generated primarily within the product mass. However, in most instances this does not impair operation of the process and affects not more than a small portion of the product mass if the oven design and method of performing the process are proper.

In repetitive operation of the process, the oven walls and pistons will become hot so that the temperature differential will be minimized. The walls and pistons may, of course, be cooled by suitable means to any extent desired.

In some applications of the process it is desirable to use metal pistons in order to operate with very high pressures. The pistons may be cooled by circulation of a cooling medium through suitable passages. The metal pistons may be used in ovens with ceramic walls, in which case the current will be passed through the product mass from one piston to the other. When using such metal pistons there is an increased tendency for temperature gradient throughout the product mass. In some cases this may be overcome by facing the pistons with hard carbon. However, a more suitable means of reducing the temperature gradient is to use a layer of pulverized carbon between each piston and the product mass. With certain product mixes, there is a tendency for such carbon to stick and bond to the product mass, but this can be prevented by use of a thin screen or perforated sheet of temperature resistant alloy between the carbon and the product mass. A further advantage of such a "heat dam" is that the porous carbon layer facilitates the escape of gases. This arrangement has been found particularly useful in the preparation of hard and dense products from heavily compacted fine powders, especially when using very high rates of heating.

While the pressure and current are applied in different directions in the diagrammed illustrations, and while this arrangement may be preferred, it is, nevertheless, possible to operate the process with the pressure and current applied in the same direction.

As will be explained more fully below, a relatively high current density through the mix is desirable in order properly to heat the material. Thus a large current flow is desirable to provide the preferred initial high rate of temperature rise which will depend on the size of the oven, but, in any case, will be greater than 2° C. per minute even in large ovens, and will range up to 1000° C. per minute, or even higher in small ovens. Either alternating current or direct current may be used to provide the heating effect. It will be observed that a certain amount of power will be consumed in direct heating of the oven and in heat losses to the oven itself as distinguished from heat actually consumed in raising temperatures of the material within the baking chamber 19. The larger the mass of the material within the baking chamber, the lesser will be the proportion of the power utilized heating the oven, both due to the more favorable relationship between heat radiating surface area of the product mass and volume of the product mass and to the more favorable proportion between mass of product and mass of the entire oven. Hence, the operation is more efficient in the making of larger articles than it is in the making of smaller articles.

The rate of heating in the practice of the process of the invention is governed by several considerations such as the volatile content of the mix, the weight of the mold charge in relation to the perimeter of the mold plungers, and the plunger clearance, and to the capacity of the hydraulic system to provide rapid ram travel. Another important factor to be considered is inefficiency of power usage due to thermal losses and the related requirement that a uniform final temperature be obtained throughout the article. All of these considerations are separate from the practical need to maintain the heating-cooling cycle as short as possible in order to obtain maximum rate of product output per press.

Obviously, the mold charge must not be heated so rapidly that volatile combustible matter is produced faster than it can escape around the perimeter of the molding plunger. Likewise, the initial heating period should not proceed so rapidly that the mold charge contracts at such a fast rate that the press does not maintain sufficient pressure on the charge to keep it well compacted. On the other hand, if the rate of heating proceeds too slowly the heat losses to the mold walls and to the plungers is so great that a uniform final temperature throughout the article is not obtained.

A short time after the heating is started (depending upon the current density being employed for the heating and in some cases in much less than one minute), the material within the baking chamber will start to decrease in volume. This decrease in volume will continue until a final reduced volume has been achieved, at which time continuation of the heating will produce no further substantial change in product size, although some changes in characteristics or properties of the product will continue to take place during further heating. After the formed article is removed from the oven or after the pressure is released, further heating will have little effect on the mechanical strength characteristics, although improvement in electrical conductivity may be produced by such further heating.

When the temperature is increased and the coal tends to soften and produce tars and vapors, the coal necessarily tends to flow into the voids and to shrink in volume. Under these circumstances, the applied pressure causes the particles to rearrange while the mass is maintained under pressure. All effective shrinkage must be restricted to the direction of the applied pressure and the pressure must be high enough to cause the necessary rearrangement. If the pressure is not sufficiently high, the tendency of the mass to shrink in all directions becomes operative and internal cracks and fissures develop. Furthermore, under the circumstances, the product mass can pull away from the oven walls so that the mass is no longer supported by the walls, and then compression breakage can take place due to the applied pressure if the compressive strength becomes less than the force of the applied pressure. It is important that the product mass be properly supported by the oven walls and that the oven be sufficiently rigid that failure of support cannot take place due to distortion of the oven walls. This is particularly true when the process is operated to make hard, strong products from mixtures which contain little or no graphite. When graphite is present, it exerts an internal lubricating effect which assists the applied pressure in effecting the proper compression of the mass. Thus, mixtures which contain graphite can be formed into dense, fissure-free products with lower pressure than those which do not contain graphite. The graphites which have high lubricating values are most effective in this respect. The degree of fineness and the shape characteristics of the particles in the mixture also affect the response to pressure, as would be expected.

As heating is continued with rapid rate of temperature rise and maintenance of high pressure on the mass, the processes of volatilization and cracking and deposition of bonding material continue. Likewise the softening and shrinking of the coal and the production of coal tar and subsequent thermal decomposition of the coal tar and the rearrangement of the particles continue. As the foregoing actions continue, the coal and the coal tar and the bond forming material resulting from cracking of these and the lighter volatile materials gradually approach fixed carbon in composition. Ultimately, no substantial further shrinkage occurs.

If the heating is stopped and the product is removed from the oven after substantially all the shrinkage has taken place, but before all the gas forming material has been volatilized or cracked, the product will have good mechanical properties, but the electrical resistivity will be high. A product removed from the oven prematurely in this way will also frequently be cracked or even broken into two or more pieces. The heating preferably should be continued at a rapid rate and under pressure until the electrical resistivity has become substantially reduced. This continued heating will generally somewhat improve the mechanical strength characteristics also, and will stabilize the properties so that additional heating outside of the oven will not cause any substantial deterioration in mechanical strength characteristics. This final product with stabilized strength characteristics will not always have the minimum attainable electrical resistivity, but it will have a decreased resistivity compared to the resistivity of the original compressed but uncooked product forming mass. It has been found that continued heating at elevated temperatures may reduce the resistivity to an even lower value, but such heating can be carried out in various ways without harmful effect on mechanical strength characteristics if the original cooking under pressure was carried far enough. Such further heating may result in some further evolution of gases, particularly hydrogen, but such evolution will be very slight and of the order normally experienced in the conversion of ordinary baked carbon into graphite, because a properly baked article produced according to the invention will have been heated under pressure until decomposition of hydrocarbons is substantially complete.

There is a relationship between the volatile matter content of the product forming material and the desirable rate of temperature rise. In general, a lesser rate of temperature rise is permissible for a greater proportion of volatile matter.

In a typical run making a small article (¼" x ¼" x 1½" final size) and employing 80% articficial (electric furnace) graphite and 20% bituminous coal, shrinkage of the mix was not observed until about 20 seconds after heating was commenced. The material then shrank an amount roughly equal to about 30% of the total ultimate shrinkage, remained at this volume another 20 seconds, and then rapidly shrank another approximately 30%, and thereafter continued to shrink intermittently until the shrinkage was complete.

The formed article may possess an electrical conductivity at least as great as that of commercial grades of graphite electrodes and higher mechanical strength characteristics. Furthermore, the apparent density may be very high, e.g., 1.8 gms./cm.$^3$, 2.0 gms./cm.$^3$, or even higher. The high electrical conductivity of the product is believed to be due to intimate contact of the graphite or equivalent particles with each other, a contact which is not substantially disturbed by the formation of the carbon bonds. The carbon bonds hold he graphite or other fixed carbon particles together under pressure when the article is removed from the oven. It has been found that the conductivity of the articles made in accordance with the invention will tend to exhibit a higher electrical conductivity at elevated temperatures.

The process can be operated with one basic starting material alone, such as a suitable petroleum coke, in its raw and calcined forms, without any other binding, agglutinating, plasticizing, or inhibiting agent being present in the mix. It is not consistent with the theory, and it is believed possible, that a suitable raw petroleum coke alone, without any other binding, agglutinating, plasticizing or inhibiting agent present in the coke, could, with use of a sufficiently high pressure, yield a product free of fissures and well bonded.

As has been disclosed, materials such as sugar, or wood, or petroleum, which initially contain no fixed carbon, or very little of it, can be used as the volatile combustible matter containing component. Such materials do not yield products as strong as those obtained with volatile combustible matter containing material, which also contain appreciable fixed carbon, such as coal or raw petroleum coke.

A partially calcined coal or petroleum coke can be used, but it is not as effective as the raw material. It is apparaent that heating such materials at atmospheric pressure causes the loss of valuable ingredients even at relatively low temperatures. It is thus apparent that the carbonaceous substances which will become liquids at relatively low temperatures during the baking cycle must be particularly advantageous for proper operation of the process and production of the best products. In the case of the calcined materials, the gas bonding action which can take place due to the presence of high temperature volatile combustible matter is not sufficient to permit effective operation of the process. It is believed that presence of liquid or tar forming carbonaceous materials must be necessary to permit adequate compacting of the mass.

It is not certain whether the theoretical explanation set forth above is actually the correct explanation for the observed phenomena. However, an understanding of the theoretical reasons for the results is not essential for practicing the invention.

Figure 2:
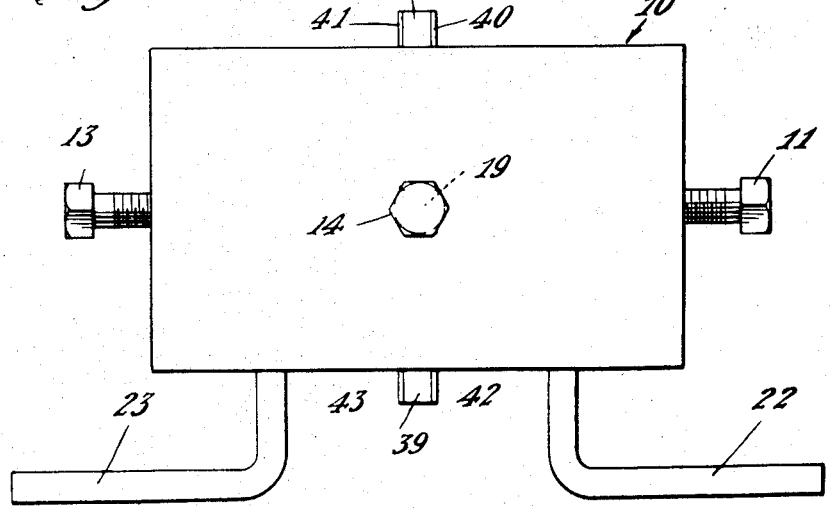
FIG. 2 is a front elevational view of the oven and mold of FIG. 1.

There will now be set forth representative test data acquired in practicing the process of the invention in an oven of the type illustrated in FIGS. 1–4 of the drawings, the oven being dimensioned to produce blocks of the type shown in FIG. 5 and having dimensions of ¼" x ¼" x 1½". The carbon blocks 32 and 35 are identical and have dimensions of 2" x 1" (FIG. 1) x 2½" (FIG. 2). The carbon blocks 20 and 21 are also identical and have dimensions of 1" x 2" (FIG. 1) x 2½" (FIG. 2). The carbon blocks 26 and 27 have dimensions of ¼" x ¼" x 2½" while the piston blocks 38 and 39 have dimensions of ¼" x 1½" (FIG. 1) x 1⅜" (FIG. 2). It should be understood that these dimensions are given solely for purposes of illustration and do not limit the invention. In fact, most commercial applications will require far larger ovens.

The dry carbonaceous mixture to be placed in the oven was prepared by grinding the constituents, e.g., bituminous coal or petroleum coke and graphite, to the desired fineness as determined by the mesh size or sizes through which the ground constituents were passed. The ground constituents were then thoroughly mixed. The lower piston 39 was then inserted in the oven and the dry carbonaceous mixture poured into the oven through the aperture formed by the absence of the upper piston 38. The desired pressure was then applied to the charge in the baking chamber 19 by the pressure applying means 44 and 45 acting against the adjacent surfaces of the pistons 38 and 39, respectively. It should be observed that, while the charge is made up of solid particles, the particles are sufficiently mobile that the pressure distribution within the baking chamber is very similar to that which would exist if the charge were liquid in character. A 60 cycle alternating current at a desired amperage and voltage was passed through the charge by connecting the electrodes 22 and 23 to a suitable power source, which in this case was a transformer. It will be understood that any suitable power source could have been employed and that direct current or alternating currents of other frequencies will also provide satisfactory results.

The cooking may be carried out in one step or in more than one step, so long as significant temperature increases are rapid. Preferably, the process is carried out continuously; and when more than one step is used the changes in current density should be effected immediately so that no interruption of the process will occur. Carrying out the process with multi-step temperature increases is undesirable for small articles, such as the one referred to in connection with the oven dimensions given above. A preferred method of continuous cooking has been to cook in two steps, the first being with a current density substantially less than that used in the second step. It has been found desirable to continue the first step long enough for most of the shrinkage to occur and then to follow immediately with the higher current density second step. It will be appreciated that the temperature achieved in the baking chamber 19 will be a function of both the current density and the time of current application as well as of oven construction. Cooking at too slow a rate, i.e., with too low a current density, generally adversely affects the small size products in proportion to the time of cooking under such gentle conditions. If the current density is above a critical value for a particular furnace and particular charge, there is little adverse effect even from long cooking since the rate of temperature rise is sufficiently high during the interval in which thermal decomposition or cracking of the charge occurs. However, it has been found that the best products are generally obtained with the fastest cooking.

In the following examples, it is to be understood that the cook is always continuous even though more than one step is cited.

*Example I*

In this test, which was carried out in the oven described above, the charge consisted of 80% electric furnace graphite which would pass a 200 mesh screen and 20% bituminous coal which would also pass a 200 mesh screen. The bituminous coal contained approximately 1.6% ash and 26.4% volatile combustible matter. The charge weighed 3.5 grams. After the charge was placed in the oven it was subjected to a mechanical pressure of 3300 p.s.i. The following chart sets forth the test data for a cook lasting 3⅔ minutes and carried out in two steps, the first of which had a starting current of 560 amps. and the second a starting current of 1040 amps. The chart sets forth the time in minutes, the voltage (voltage differential between the current connectors to the oven electrodes) in volts, the total amperes, and the cumulative shrinkage in inches.

| Time (min.) | Volts | Amps. | Cumulative shrinkage (in.) | Step |
|---|---|---|---|---|
| 0 | 1.30 | 560 | 0 | 1 |
| ⅓ | 1.20 | 576 | 0.01804 | 1 |
| ⅔ | 1.19 | 576 | 0.03608 | 1 |
| 1 | 1.19 | 576 | 0.04816 | 1 |
| 1⅓ | 1.20 | 573 | 0.07624 | 1 |
| 1⅔ | 1.21 | 565 | 0.07624 | 1 |
| 2⅓ | 2.40 | 1,040 | 0.07624 | 2 |
| 2 | 2.00 | 1,138 | 0.07624 | 2 |
| 2⅓ | 1.90 | 1,160 | 0.07624 | 2 |
| 2⅔ | 1.85 | 1,170 | 0.07624 | 2 |
| 3 | 1.80 | 1,178 | 0.07624 | 2 |
| 3⅓ | 1.79 | 1,180 | 0.07624 | 2 |
| 3⅔ | 1.85 | 1,182 | 0.07624 | 2 |

It will be observed that the shrinkage was complete at 1⅓ min. The resistance of the blocks was measured and the resistivity computed to be $5.35 \times 10^{-4}$ ohm-inches. The term "ohm-inches" is intended to be synonymous with "ohms per inch cube," both being a unit of specific resistivity. The compressive and transverse strengths were found to be 9480 p.s.i. and 7660 p.s.i., respectively. The methods of determining compressive strength and transverse strength will be described in detail below. The article was found to have an apparent density of 1.750 gms./cm.$^3$.

*Example II*

In this test the charge was identical to the charge used in Example I, and the pressure applied to the charge in the oven was the same as that of Example I. The following charts sets forth the test data for a cook lasting 7⅔ minutes and carried out in two steps, the first of which had a starting current of 560 amps. and the second a starting current of 1040 amps.

| Time (min.) | Volts | Amps. | Cumulative shrinkage (in.) | Step |
|---|---|---|---|---|
| 0 | 1.30 | 560 | 0 | 1 |
| ⅓ | 1.20 | 571 | 0 | 1 |
| ⅔ | 1.19 | 576 | 0.02416 | 1 |
| 1 | 1.20 | 573 | 0.06046 | 1 |
| 1⅓ | 1.20 | 572 | 0.06046 | 1 |
| 1⅔ | 1.25 | 570 | 0.06046 | 1 |
| 1⅔ | 2.40 | 1,040 | 0.06046 | 2 |
| 2 | 2.00 | 1,142 | 0.07553 | 2 |
| 2⅓ | 1.99 | 1,152 | 0.07553 | 2 |
| 2⅔ | 1.90 | 1,166 | 0.07553 | 2 |
| 3 | 1.85 | 1,166 | 0.07553 | 2 |
| 3⅓ | 1.80 | 1,170 | 0.07553 | 2 |
| 3⅔ | 1.80 | 1,170 | 0.07553 | 2 |
| 4 | 1.80 | 1,172 | 0.07553 | 2 |
| 4⅓ | 1.75 | 1,172 | 0.07553 | 2 |
| 4⅔ | 1.75 | 1,172 | 0.07553 | 2 |
| 5 | 1.70 | 1,175 | 0.07553 | 2 |
| 5⅓ | 1.70 | 1,175 | 0.07553 | 2 |
| 5⅔ | 1.70 | 1,175 | 0.07553 | 2 |
| 6 | 1.65 | 1,175 | 0.07553 | 2 |
| 6⅓ | 1.65 | 1,175 | 0.07553 | 2 |
| 6⅔ | 1.65 | 1,175 | 0.07553 | 2 |
| 7 | 1.63 | 1,175 | 0.07553 | 2 |
| 7⅓ | 1.62 | 1,175 | 0.07553 | 2 |
| 7⅔ | 1.61 | 1,175 | 0.07553 | 2 |

The resistance of the blocks was measured and the resistivity computed to be $4.35 \times 10^{-4}$ ohm-inches. The compressive and transverse strengths were found to be 11,150 p.s.i. and 7660 p.s.i., respectively. The final article was found to have an apparent density of 1.767 gms./cm.$^3$.

For measuring the compressive strength, a sample having about a ½" length and a cross-sectional area of about .0625 sq. in. was subjected to a compressive force in the long dimension, and the compressive force in lbs. required to break the sample was recorded. From this force the compressive strength in lbs. per sq. in. was computed. In measuring the transverse strength, a similar sample was supported by blocks spaced approximately 1 in. from each other and pressure was applied by a knife disposed perpendicularly to the long axis of the sample and located at a point midway between the supporting blocks.

For larger articles, numerous samples could be cut from the formed block, as shown in FIG. 6 in which samples A, B and C come from a corner, sample D from the middle of a face, and samples E and F from the center of the block. The large blocks referred to in the following Examples III and IV have cross-sectional areas of about 16 sq. in.

*Example III*

The following test was made in an oven constructed generally as shown in FIGS. 1–4, but larger than described above. The materials, i.e., coal and graphite, were the same and in the same proportions as in the previous examples. However, 2720 gms. of the mixture were used and the applied pressure was 2750 p.s.i. The material was heated to a final temperature of approximately 2000° F. The following table illustrates the data in a 24 minute cook.

| Time (min.) | Volts | Amps. | Approx. temp. ° F. |
|---|---|---|---|
| 0 | 4.50 | 5,680 | 80 |
| 1 | 4.50 | 5,880 | 300 |
| 2 | 4.45 | 6,070 | 450 |
| 3 | 4.42 | 6,270 | 610 |
| 4 | 4.42 | 6,270 | 730 |
| 5 | 4.43 | 5,880 | 850 |
| 6 | 4.45 | 5,680 | 970 |
| 7 | 4.42 | 6,070 | 1,080 |
| 10 | 4.38 | 6,860 | 1,390 |
| 15 | 4.39 | 6,860 | 1,660 |
| 20 | 4.39 | 6,760 | 1,880 |
| 24 | 4.39 | 6,760 | 2,020 |

Resistivity in ohm-inches, density in gms./cm.$^3$, compressive strength in p.s.i., and transverse strength in p.s.i. of samples A, B, C, D, E and F, the source of which with relation to the block shown in FIG. 6, are set forth in the following table:

| Sample | Resistivity | Apparent density | Compressive strength | Transverse strength |
|---|---|---|---|---|
| Block | | 1,685 | | |
| A | 6.92×10⁻⁴ | 1.726 | 12,550 | 6,500 |
| B | 6.07×10⁻⁴ | 1.732 | 11,800 | 5,360 |
| C | 14.50×10⁻⁴ | 1.650 | 9,670 | 3,590 |
| D | 6.00×10⁻⁴ | 1.686 | 9,050 | 6,320 |
| E | 6.92×10⁻⁴ | 1.630 | 9,560 | 4,930 |
| F | 15.50×10⁻⁴ | 1.600 | 9,430 | 3,020 |

A faster rate of temperature rise could have been used and would have yielded even better product characteristics.

It has been found that the resistivity of the material produced in accordance with the process of the invention differs in different directions. This is exemplified by the resistivity table of Example III in which the resistivity of samples A, B, D and E is quite similar, whereas the resistivity of samples C and F differs markedly from the others. An examination of FIG. 6 will show that samples A, B, D and E are taken horizontally, whereas samples C and F are vertical. The difference in resistivity in the different directions is related to the direction of pressure application during heating, a higher resistivity being found parallel to the direction of pressure application.

When making larger blocks, such as the block of Example III, which is about 4″ x 4″ x 6″, it has been found that the temperature may conveniently be kept constant for a considerable period of time at or below the temperature at which shrinking begins, and at or above the point where shrinking ceases, so long as a rapid temperature rise is used in the temperature region between these two points.

In the case of a mixture such as that used in this example, for instance, it has been observed that the shrinkage took place principally between the temperatures 450° F. and 850° F. In a similar cook, when the temperature was first raised rapidly to 400° F. and then held close to that temperature for one hour, or when the temperature was first raised rapidly to 870° F. and then held close to that temperature for one hour, the products showed a small loss in compressive strength. However, when the temperature was permitted to increase slowly, taking a period of 90 minutes to increase from room temperature to 850° F. and thereafter the cook was completed with a normal rapid increase in temperature, the products suffered even more. In all these cooks the mixtures and pressures and final temperatures were the same. Compressive tests and resistivities on the "B" samples showed the following:

| Cook | Compressive strength, p.s.i. | Resistivity ohm-inches |
|---|---|---|
| Normal cook | 11,800 | 6.07×10⁻⁴ |
| Cook held at 400° F | 9,400 | 6.40×10⁻⁴ |
| Cook held at 870° F | 8,720 | 5.66×10⁻⁴ |
| Cook raised slowly to 850° F | 6,270 | 6.42×10⁻⁴ |

It is thus apparent that the most rapid temperature rise is desirable for the development of maximum strength, but that it would be possible to use a low initial temperature rise up to the point at which shrinkage starts, if any advantage would accrue from such procedure, such as assistance in the elimination of air and non-condensable gases to achieve a higher density. With smaller blocks, such as the ones of Examples I and II, it is desirable to maintain a rapid rate of temperature rise throughout the cook. While the minimum rate of temperature rise required to produce a desirable product will vary depending upon the composition of the mix as well as the other process conditions, it has been found preferable to employ a minimum rate of temperature rise of about 2° C. per minute and a pressure not less than about 1000 p.s.i.

*Example IV*

The following test is similar to that of Example III in that 2720 gms. of mix were used and the applied pressure was 2750 p.s.i. However, the mixture was 8% hard pitch, which would pass a 100 mesh screen, and 92% artificial graphite, which would pass a 200 mesh screen. The material was heated to a final temperature of about 1920° F., and shrinking commenced almost immediately after cooking started and was substantially completed at the end of 6 minutes. The following table sets forth variation in temperature with cooking time during a 52 minute cook:

Time (min.): Temperature, °F.
0 _____ 70
1 _____ 150
2 _____ 260
3 _____ 360
4 _____ 430
5 _____ 505
10 _____ 830
20 _____ 1310
28 _____ 1515
40 _____ 1760
52 _____ 1920

It will be observed that a relatively slow temperature rise was used; a faster rate of temperature rise would improve both product characteristics and process efficiency.

Resistivity in ohm-inches, density, compressive strength in p.s.i., and transverse strength in p.s.i. of samples A, B, C, D and E for this cook are set forth in the following table:

| Sample | Resistivity ×10⁻⁴ | Density | Compressive strength | Transverse strength |
|---|---|---|---|---|
| Block | | 1.73 | | |
| A | 6.25 | 1.772 | 6,500 | 3,730 |
| B | 5.66 | 1.735 | 5,360 | 3,400 |
| C | 11.9 | 1.64 | 6,030 | 1,340 |
| D | 6.58 | 1.69 | 5,700 | 2,865 |
| E | 5.92 | 1.725 | 5,600 | 2,775 |

*Example V*

While all of the foregoing examples contained graphite of some type, it is possible to make products from mixtures of materials that do not include graphite.

In the following example the oven size and type were the same as in Example IV, but the mixture contained only petroleum coke. The mixture was 1400 grams and consisted of 25% of a commercial raw petroleum coke containing 14% volatile combustible matter and 75% of calcined petroleum coke such as is sold commercially for manufacture of electrodes. Both materials were crushed to pass a 200 mesh screen. The mixture was subjected to a pressure of 2700 p.s.i. throughout the cooking cycle, and the test data are as follows:

| Time (min.) | Volts | Amps. | Total shrinkage (in.) | Step |
|---|---|---|---|---|
| 0 | 3.50 | 1,770 | 0 | 1 |
| 10 | 3.45 | 2,340 | 0.0438 | 1 |
| 20 | 3.40 | 2,980 | 0.0515 | 1 |
| 25 | 3.40 | 3,100 | 0.0531 | 1 |
| 25 | 4.55 | 4,410 | 0.0531 | 2 |
| 35 | 4.50 | 5,390 | 0.0531 | 2 |
| 35 | 5.55 | 7,280 | 0.0531 | 3 |
| 45 | 5.45 | 8,240 | 0.0579 | 3 |

The product had the dimensions 5″ x 4″ x 2½″ and it was free from pores and cracks. It had a density of 1.55 g./cc., a compressive strength of 4790 p.s.i., and a transverse strength of 1840 p.s.i.

The product was subjected to graphitization in a conventional way by heating to 3000° C. in a graphitizing furnace. Before heating it had a resistivity of 0.0026 ohm-inch along the longest axis. After heating to 3000° C., it had a resistivity of 0.00063 ohm-inch along the long axis. Before heating to 3000° C., it had a coefficient of thermal expansion per ° C. in the 0–250° C. range of $2.4 \times 10^{-6}$ along the longest axis. After heating to 3000° C., the coefficient was $1.6 \times 10^{-6}$ along the longest axis.

A product with such characteristics would be suitable for most electrode applications. Even better properties can be achieved, however, by suitably altering the ingredients and conditions of the initial cook.

*Example VI*

In the following example, the mixture contained three constituents, all pulverized to pass a 200 mesh screen. The mixture was 3.5 grams and consisted of 40% of electric furnace graphite, 35% calcined petroleum coke, and 25% bituminous coal. The mixture was subjected to a pressure of 3,300 p.s.i. throughout the cooking cycle, and the test data are as follows:

| Time (min.) | Amps. | Cumulative shrinkage (in.) | Step |
|---|---|---|---|
| 0 | 424 | 0 | 1 |
| 2 | 448 | 0.0985 | 1 |
| 4 | 445 | 0.1280 | 1 |
| 6 | 448 | 0.1305 | 1 |
| 6 | 952 | 0.1305 | 2 |
| 8 | 1,104 | 0.1305 | 2 |
| 10 | 1,120 | 0.1305 | 2 |
| 12 | 1,133 | 0.1305 | 2 |

The product was smooth, dense and hard.
Tests showed the following:

Apparent density_____ 1.75.
Compressive strength_____ 15,500 p.s.i.
Transverse strength_____ 8,040 p.s.i.
Electrical resistivity_____ $7.8 \times 10^{-4}$ ohm-inches.

*Example VII*

In the following example an oven similar to that employed for Example I was used, but with the dimensions changed so as to yield a product measuring 0.4 x 0.4 x 0.4 inches. The mixture consisted of calcined petroleum coke and bituminous coal, both finely ground so that the particles ranged from one to 50 microns in size. The mixture was 2.5 grams and consisted of 65% of the calcined petroleum coke and 35% of the coal. The mixture was subjected to a pressure of 11,000 p.s.i throughout the baking cycle, and the test data are as follows:

| Time (min.) | Volts | Amps. | Step |
|---|---|---|---|
| 0 | 1.8 | 320 | 1 |
| 1/3 | 1.6 | 340 | 1 |
| 2/3 | 1.6 | 340 | 1 |
| 1 | 1.5 | 350 | 1 |
| 1 1/3 | 1.5 | 350 | 1 |
| 1 2/3 | 1.5 | 350 | 1 |
| 2 | 1.5 | 350 | 1 |
| 3 | 1.5 | 350 | 1 |
| 3 | 2.4 | 520 | 2 |
| 4 | 2.0 | 560 | 2 |
| 5 | 1.90 | 570 | 2 |
| 5 | 2.80 | 980 | 3 |
| 6 | 2.45 | 1,040 | 3 |
| 7 | 2.40 | 1,060 | 3 |

The product was hard and smooth and free from cracks, It had a density of 1.725 and a compressive strength of 26,400 p.s.i. The hardness was equal to that the hardest specialty carbons and tested at 72 with a Sklerograf tester (supplied by the Kurt Orban Company, 205 E. 42nd Street, New York city).

When the same material composition and conditions were used except with pressure decreased to 9000 p.s.i, the product had cracks. When the same conditions were used, but the mixture was altered to contain 70% in place of 65% calcined coke and 30% in place of 35% coal, it was possible to reduce the pressure to 7350 p.s.i and make a satisfactory product, whereas a cracked product resulted at 5000 p.s.i. With this same mixture and with a pressure of 11,000 p.s.i., a cracked product resulted when the cooking cycle was altered to include only steps one and three, but a product free of cracks was obtained when all three cooking steps were included. These experiments illustrate the importance of the proper balance between composition of the mixture, cooking speed, and pressure.

Using an oven designed to produce round plates or bars of 3 inches diameter, hard strong products were made with extremely rapid cooks and very fast temperature rises, using similar components for the cooking mixture. For example, a mixture consisting of 22% bituminous coal and 78% of calcined petroleum coke, both screened through a 325 mesh screen, was cooked under 5000 p.s.i pressure for one minute, raising the temperature to approximately 1800° F. during this time by means of a current density that reached as high as 1000 amps./sq. in. The product had an electrical resistivity of $18.7 \times 10^{-4}$ ohm-inches, an apparent density of 1.78 gms./cm.$^3$, and compressive and transverse strengths of 16,800 p.s.i. and 8600 p.s.i, respectively, tested on a sample taken along a radial direction. The diameter of the round plate, as taken out of the oven, was measured at different points and varied less than 0.001 inch. The hardness of the product was 62, measured with a Sklerograf tester.

*Example VIII*

The following test is similar to that of Example I in that the same oven was used. The pressure on the charge was also the same. The charge consisted of 70% electric furnace graphite which would pass a 200 mesh screen and 30% of sawdust, from a hardwood known in Cuba as "Júcaro," which would pass a 100 mesh screen. The charge weighed 3.6 grams. The following chart sets forth the test data for a cook lasting 7 2/3 minutes and carried out in two steps, the first of which had a starting current of 544 amps. and the second a starting current of 960 amps. The chart sets forth the time in minutes, the voltage in volts, and the total amperes.

| Time (min.) | Volts | Amps. | Step |
|---|---|---|---|
| 0 | 2.30 | 544 | 1 |
| 1/3 | 2.10 | 576 | 1 |
| 2/3 | 2.05 | 584 | 1 |
| 1 | 2.00 | 586 | 1 |
| 1 1/3 | 1.95 | 590 | 1 |
| 1 2/3 | 1.90 | 592 | 1 |
| 1 2/3 | 2.90 | 960 | 2 |
| 2 | 2.55 | 1,024 | 2 |
| 3 | 2.35 | 1,072 | 2 |
| 4 | 2.25 | 1,088 | 2 |
| 5 | 2.15 | 1,104 | 2 |
| 6 | 2.10 | 1,107 | 2 |
| 7 2/3 | 2.02 | 1,120 | 2 |

The shrinkage of the mixture was complete at 1/3 min. The resistance of the lock was measured and the resistivity computed to be $5.08 \times 10^{-4}$ ohm-inches. The compressive and transverse strengths were found to be 7700 p.s.i. and 4530 p.s.i., respectively. The apparent density was calculated to be 1.62 gms./cm.$^3$. The product was well bonded and hard.

*Example IX*

In this example, the charge consisted of 80% electric furnace graphite, screened to pas a 200 mesh screen, and 20% of a petroleum coke with a high volatile matter content. The latter was prepared by heating "Bunker C" petroleum oil, while stirring continuously, until the oil was highly viscous and solidified on cooling. The solid material obtained was ground and screened to pass a 200 mesh screen. A laboratory analysis, using the analytical method normally used for coal, showed that it contained 36% volatile combustible matter. The oven charge weighed 3.5 grams. Applied pressure was 3310 p.s.i. The cooling consisted of a first step of 1⅔ minutes using an initial current of 560 amps., and a second step of 6 minutes, using an initial current of 1080 amps. The following chart sets forth the data obtained during the cook.

| Time (min.) | Volts | Amps. | Step |
|---|---|---|---|
| 0 | 2.2 | 560 | 1 |
| ⅓ | 2.0 | 590 | 1 |
| ⅔ | 1.9 | 596 | 1 |
| 1 | 1.85 | 600 | 1 |
| 1⅓ | 1.82 | 602 | 1 |
| 1⅔ | 1.80 | 606 | 1 |
| 1⅔ | 2.80 | 1,080 | 2 |
| 2 | 2.45 | 1,120 | 2 |
| 3 | 2.30 | 1,140 | 2 |
| 4 | 2.20 | 1,154 | 2 |
| 5 | 2.15 | 1,160 | 2 |
| 6 | 2.10 | 1,160 | 2 |
| 7⅔ | 2.10 | 1,164 | 2 |

The electrical resistivity of the block obtained was found to be $4.28 \times 10^{-4}$ ohm-inches. The apparent density was 1.72 gms./cm.$^3$. The compressive and transverse strengths were determined to be 6840 p.s.i. and 7060 p.s.i. respectively.

As explained previously, it is desirable for many purposes to secure very high density products, i.e., products having apparent densities around or above 2.0 gms./cm.$^3$. The following examples, which represent test runs in small ovens of the type employed in connection with Examples I and II illustrate how densities over 1.90 and especially over 1.94 can be secured.

*Example X*

In the following example, the oven was similar to that of Example I except that the cross-sectional area of the mold cavity was reduced to 0.4 x 0.4 inch. The mixture contained pulverized electric furnace graphite sized to 200/270 mesh and a petroleum coke prepared by heating No. 6 fuel oil until it was solid at room temperature and had been reduced to 40% content of volatile combustible matter. The special coke was crushed to pass a 200 mesh screen. The mixture was 2.5 grams and consisted of 85% of the graphite and 15% of the coke. The mixture was subjected to a pressure of 11,000 p.s.i. throughout the cooking cycle, and the test data follow:

| Time (min.) | Volts | Amps. | Step |
|---|---|---|---|
| 0 | 1.70 | 340 | 1 |
| 1 | 1.55 | 350 | 1 |
| 2 | 1.50 | 350 | 1 |
| 3 | 1.50 | 350 | 1 |
| 3 | 2.30 | 540 | 2 |
| 4 | 2.10 | 550 | 2 |
| 5 | 2.10 | 560 | 2 |
| 5 | 3.00 | 960 | 3 |
| 6 | 2.60 | 1,020 | 3 |
| 7 | 2.50 | 1,040 | 3 |

The product was close grained and dense. The apparent density was 1.925 gms./cm.$^3$. The Sklerograf hardness was 40.

*Example XI*

Natural graphite may be used, in place of artificial graphite, in order to achieve higher density and better electrical conductivity, although generally poorer mechanical strength characteristics will be secured. The following test was made in a small oven of the type and size employed in Examples I and II. The charge consisted of 3.6 grams, including 92% of purified natural lubricating flake graphite and 8% of raw petroleum coke. The graphite was purified so as to contain less than 0.1% ash and it was sized to pass a 30 mesh screen and be retained in a 40 mesh screen. The raw petroleum coke was a commercial product that contained 14% volatile combustible matter. It was crushed and screened to pass a 200 mesh screen. The pressure applied during the baking was 5000 p.s.i., and the following data were taken during the test:

| Time (min.) | Volts | Amps. | Cumulative shrinkage (in.) | Step |
|---|---|---|---|---|
| 0 | 2.0 | 560 | 0 | 1 |
| ⅓ | 1.95 | 570 | 0.00247 | 1 |
| ⅔ | 1.90 | 574 | 0.00370 | 1 |
| 1 | 1.80 | 580 | 0.00370 | 1 |
| 1⅓ | 1.80 | 580 | 0.00370 | 1 |
| 1⅔ | 1.80 | 580 | 0.00370 | 1 |
| 2 | 1.80 | 580 | 0.00370 | 1 |
| 2⅓ | 1.80 | 580 | 0.00370 | 1 |
| 2⅔ | 1.80 | 580 | 0.00370 | 1 |
| 3 | 1.80 | 580 | 0.00370 | 1 |
| 3 | 2.75 | 960 | 0.00370 | 2 |
| 4 | 2.50 | 1,020 | 0.00370 | 2 |
| 5 | 2.40 | 1,040 | 0.00370 | 2 |
| 6 | 2.30 | 1,054 | 0.00493 | 2 |
| 7 | 2.25 | 1,064 | 0.00493 | 2 |
| 8 | 2.20 | 1,070 | 0.00493 | 2 |
| 9 | 2.20 | 1,076 | 0.00493 | 2 |

The product had the dimension ¼" x 1½" x approximately ¼". The apparent density was 2.087 gms./cm.$^3$. The electrical resistivity measured along the long axis was $0.808 \times 10^{-4}$ ohm-inches. The transverse breaking strength with load applied perpendicular to the long axis was 1590 p.s.i.

In a similar cook with the same material except with the percentage composition changed to 85% graphite and 15% coke, the apparent density was 2.026, the electrical resistivity was $0.863 \times 10^{-4}$ ohm-inches, and the transverse breaking strength was 1540 p.s.i.

A similar cook made with 94% of the graphite and 6% of No. 6 fuel oil gave an apparent density of 2.068 and a transverse strength of 750 p.s.i.

*Example XII*

Higher strength can be obtained along with high density by using graphite of smaller particle size and combining this with the proper type and quantity of volatile combustible matter containing material. In the following test, the oven was the same as used in Example VIII. The mixture was 3.7 grams and consisted of 90% of natural lubricating flake graphite that had been purified to an ash content below 0.1%, and 10% of a special raw petroleum coke. The graphite was crushed and sized to pass a 200 mesh screen and be retained on a 270 mesh screen. The petroleum coke was prepared by heating No. 6 fuel oil until the volatile combustible matter content was 61%. This special coke was solid at room temperature. The coke was crushed to pass a 200 mesh screen. The applied pressure was 5000 p.s.i. throughout the test. The following table sets forth the data taken during the test:

| Time (min.) | Volts | Amps. | Cumulative shrinkage (in.) | Step |
|---|---|---|---|---|
| 0 | 1.70 | 600 | 0 | 1 |
| ⅓ | 1.60 | 620 | 0.03200 | 1 |
| ⅔ | 1.60 | 620 | 0.03447 | 1 |
| 1 | 1.55 | 620 | 0.04432 | 1 |
| 1⅓ | 1.55 | 620 | 0.04925 | 1 |
| 1⅔ | 1.50 | 620 | 0.05418 | 1 |
| 2 | 1.50 | 620 | 0.05418 | 1 |
| 2⅓ | 1.45 | 630 | 0.05418 | 1 |
| 2⅔ | 1.45 | 630 | 0.05418 | 1 |
| 3 | 1.45 | 630 | 0.05418 | 1 |
| 3 | 2.40 | 1,100 | 0.05418 | 2 |
| 4 | 2.00 | 1,140 | 0.05418 | 2 |
| 5 | 1.95 | 1,150 | 0.05418 | 2 |
| 6 | 1.90 | 1,160 | 0.05418 | 2 |
| 7 | 1.90 | 1,160 | 0.05418 | 2 |
| 8 | 1.85 | 1,180 | 0.05418 | 2 |
| 9 | 1.85 | 1,180 | 0.05418 | 2 |

The product had an apparent density of 2.018 gms./cm.$^3$, an electrical resistivity of $1.725 \times 10^{-4}$ ohm-inches measured along the long axis, a compressive strength of 1635 p.s.i. in the same direction, and a transverse breaking strength of 3175 p.s.i. with the load applied perpendicular to the long axis, Another cook made from 3.8 grams of a similar graphite, ground to pass a 200 mesh screen, and with similar cooking conditions of current and pressure, but using a standard commercial raw petroleum coke, gave a lower density. In the case of the 200 mesh petroleum coke, which contained 14% volatile combustible matter, it was found that a mixture containing 85% of the graphite and 15% of the coke gave higher apparent density than a mixture containing either 90–10 or an 80–20 ratio of graphite to coke, when using a pressure of 5000 p.s.i. The apparent density was 1.93, the electrical resistivity was $2.375 \times 10^{-4}$ ohm-inches, and the transverse breaking strength was 2640 p.s.i., with measurement made in the same direction as in the foregoing example.

Another cook was made using the special 200 mesh petroleum coke containing 61% volatile combustible matter but using graphite obtained by decomposition of silicon carbide in place of the natural flake graphite. The mesh size of the graphite was minus 200 plus 270 mesh, and the mixture was 90% of the graphite and 10% of the special petroleum coke. The cooking pressure was 5000 p.s.i., and the product had an apparent density of 1.98 gms./cm.$^3$, with electrical resistivity of $2.268 \times 10^{-4}$ ohm-inches, compressive strength of 3170 p.s.i., and transverse strength of 3680 p.s.i. The decomposed silicon carbide is of particular interest for such an application because of its purity. Still higher densities could be obtained with the fine graphite, such as 200/270 mesh, by use of higher applied pressures during the cooking. The maximum density results, however, not only from use of high pressure but from selection of the type and quantity of volatile combustible matter containing materials that give optimum values for the particular graphite and pressure to be used.

*Example XIII*

The following example illustrates the preparation of a high density material in a somewhat larger oven. The oven was similar to that of Example III, with a cavity measuring 5″ x 4″ perpendicular to the direction of applied pressure. The mixture weighed 700 grams and consisted of 90% natural flake graphite purified so that the ash content was 0.05%, and 10% of commercial raw petroleum coke containing 14% volatile combustible matter. The petroleum coke was crushed to pass a 200 mesh screen and the flake graphite was a mixture of sizes, approximately as follows:

| | Percent |
|---|---|
| Larger than 30 mesh | 7 |
| 30/40 mesh | 21 |
| 40/50 mesh | 28 |
| 50/70 mesh | 39 |
| 70/100 mesh | 3 |
| Smaller than 100 mesh | 2 |

The pressure applied during the baking was 2700 p.s.i. The following table summarizes the data obtained during the test:

| Time (min.) | Volts | Amps. | Cumulative shrinkage (in.) | Step |
|---|---|---|---|---|
| 0 | 3.45 | 1,900 | 0 | 1 |
| 10 | 3.45 | 2,220 | 3/64 | 1 |
| 20 | 3.45 | 2,470 | 3/64 | 1 |
| 30 | 3.45 | 2,790 | 3/64 | 1 |
| 30 | 4.55 | 4,120 | 3/64 | 2 |
| 36 | 4.50 | 4,810 | 3/64 | 2 |
| 45 | 4.50 | 5,690 | 4/64 | 2 |

The apparent density of the product was 2.005 gms./cm.$^3$. It was bonded and had appreciable strength.

*Example XIV*

In this example the mix was 3.8 grams and consisted of 92.5% chemically purified natural lubricating flake graphite screened to pass through a 30 mesh screen and to be held in a 40 mesh screen, and 7.5% of raw petroleum coke screened to pass through a 200 mesh screen. The raw petroleum coke contained 41% volatile combustible matter and was prepared by heating "Bunker C" fuel oil, which was continuously stirred during heating. The mixture was subjected to 5000 p.s.i., and the test data is as follows:

| Time (min.) | Volts | Amperes | Step |
|---|---|---|---|
| 0 | 1.85 | 568 | 1 |
| 1/3 | 1.80 | 568 | 1 |
| 2/3 | 1.75 | 568 | 1 |
| 1 | 1.70 | 573 | 1 |
| 1 1/3 | 1.70 | 576 | 1 |
| 1 2/3 | 1.70 | 579 | 1 |
| 2 | 1.70 | 579 | 1 |
| 2 1/3 | 1.70 | 579 | 1 |
| 2 2/3 | 1.70 | 579 | 1 |
| 3 | 1.70 | 579 | 1 |
| 3 | 2.85 | 1,000 | 2 |
| 4 | 2.60 | 1,048 | 2 |
| 5 | 2.50 | 1,067 | 2 |
| 6 | 2.40 | 1,077 | 2 |
| 7 | 2.35 | 1,091 | 2 |
| 8 | 2.30 | 1,101 | 2 |
| 9 | 2.25 | 1,107 | 2 |

The resultant product exhibited a resistivity of $0.706 \times 10^{-4}$ ohm-inches, an apparent density of 2.077 gms./cm.$^3$, and a transverse strength of 2110 p.s.i.

*Example XV*

In the following example the mixture contained both large and small sized particles of natural lubricating flake graphite. The mixture was 3.8 gms. and consisted of 70% natural lubricating flake graphite screened to pass a 30 mesh screen and to be held in a 40 mesh screen, 20% natural lubricating flake graphite screened to pass through a 200 mesh screen, and 10% bituminous coal screened to pass through a 200 mesh screen. The mixture was subjected to a pressure of 5000 p.s.i. and the test data are as follows:

| Time (min.) | Amperes | Step |
|---|---|---|
| 0 | 596 | 1 |
| 1/3 | 596 | 1 |
| 2/3 | 600 | 1 |
| 1 | 600 | 1 |
| 1 1/3 | 604 | 1 |
| 1 2/3 | 604 | 1 |
| 2 | 606 | 1 |
| 2 1/3 | 606 | 1 |
| 2 2/3 | 608 | 1 |
| 3 | 606 | 1 |
| 3 1/3 | 604 | 1 |
| 3 2/3 | 606 | 1 |
| 4 | 608 | 1 |
| 4 | 1,020 | 2 |
| 5 | 1,078 | 2 |
| 6 | 1,090 | 2 |
| 7 | 1,100 | 2 |
| 8 | 1,110 | 2 |
| 9 | 1,120 | 2 |
| 10 | 1,124 | 2 |

The resultant product exhibited a resistivity of $0.875 \times 10^{-4}$ ohm-inches, an apparent density of 2.055 gms./cm.$^3$, and a transverse strength of 3820 p.s.i. The combination of mesh sizes employed in this example yielded a product with a density substantially that which would be predicted by calculation from the densities of products made up from both of the two graphite mesh sizes. However, the transverse strength is much higher than would be expected from the combination and is much closer to the strength of an article made from 200 mesh size particles than to that of an article made from 30/40 mesh.

In making a high density product the pressure employed during the heating seems to exhibit considerable influence on the apparent density achieved. This is illustrated in the following table, which sets forth the pressure in p.s.i., the apparent density in gms./cm.³, and the resistivity in ohm-inches, for a series of tests at different pressures employing a mix of 15% raw petroleum coke and 85% chemically purified natural lubricating flake graphite:

| Pressure, p.s.i. | Apparent density, gms./cm.³ | Resistivity, ohm-inches |
|---|---|---|
| 2,000 | 1.985 | $.98 \times 10^{-4}$ |
| 3,000 | 2.00 | $.88 \times 10^{-4}$ |
| 4,000 | 2.03 | $.88 \times 10^{-4}$ |
| 4,500 | 2.05 | $1.14 \times 10^{-4}$ |
| 5,000 | 2.02 | $1.11 \times 10^{-4}$ |

It will be observed that the resistivities do not seem to fall into a consistent pattern. In general, it has been observed that the resistivity decreases as the density increases, but the rule is not infallible. There is some indication that the behavior of mixtures containing large graphite flakes follows some patterns that are not fully understood. With a given kind and size of graphite and a given cooking pressure, the density increases and the resistivity decreases as proportion of graphite in the mix increases up to an optimum. However, with a given composition, the resistivity sometimes increases even though apparent density also increases when the cooking pressure is increased. It will be observed that a maximum density for the particular mix and pressure illustrated in the above table was achieved at a pressure of about 4500 p.s.i., whereas a minimum resistivity was achieved at a pressure of from 3000 to 4000 p.s.i. In these tests the graphite was ground to pass a 30 mesh screen and to be held by a 40 mesh screen. In comparable tests employing the same proportions of raw petroleum coke and natural lubricating flake graphite wherein the graphite was screened to pass a 200 mesh screen, it would appear that a pressure higher than 9000 p.s.i. is necessary to achieve a maximum apparent density. This is illustrated in the following table:

Pressure, p.s.i.: Apparent density, gms./cm.³
2000 _____ 1.72
3000 _____ 1.83
4000 _____ 1.89
4500 _____ 1.91
5000 _____ 1.93
9000 _____ 2.02

The 9000 p.s.i. test was made in a smaller oven, using only 2.5 grams of mixture. However, the current was adjusted to yield a comparable test.

Figure 8:
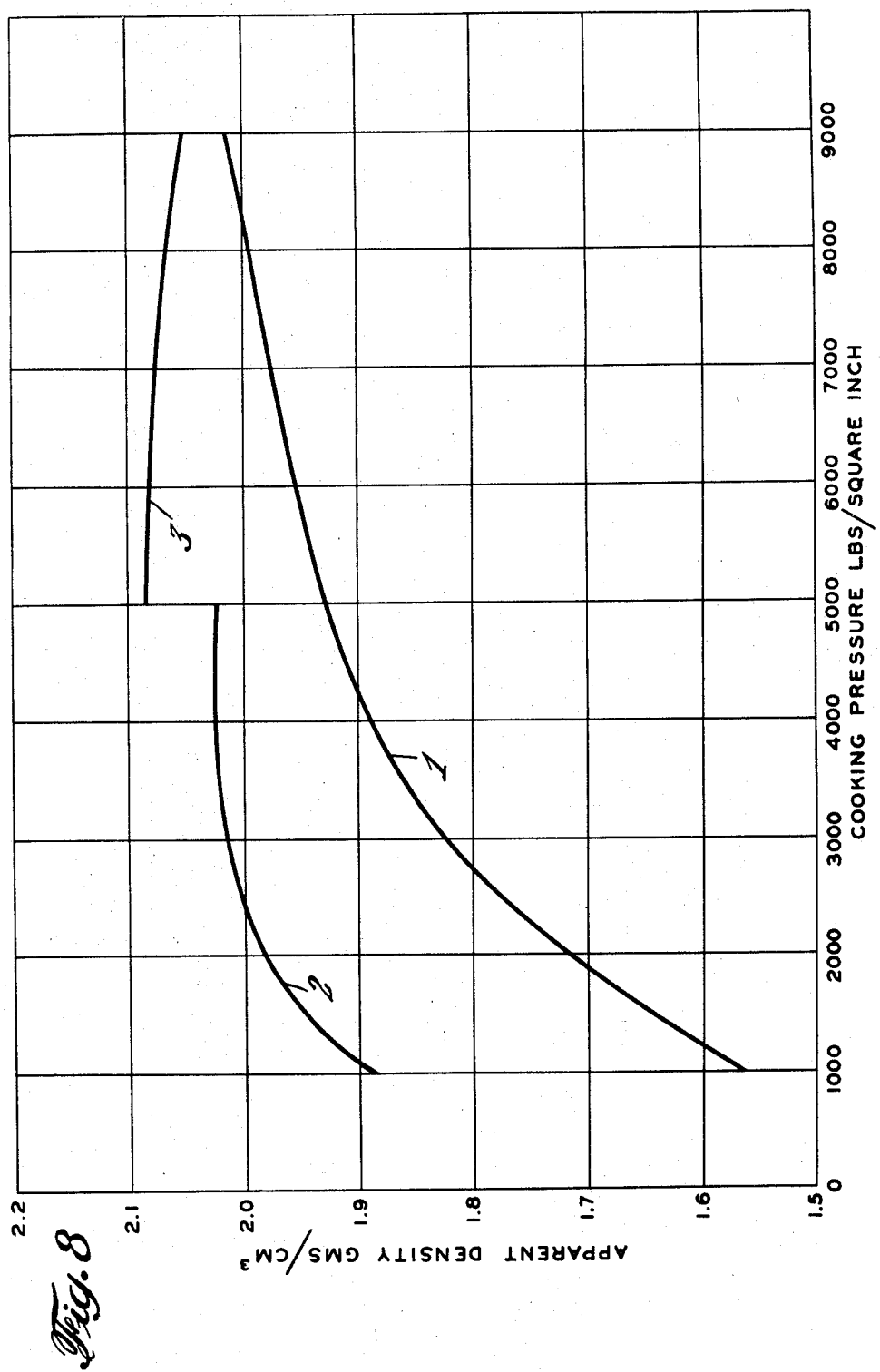
FIG. 8 is a similar set of curves showing variations in apparent density with changes in cooking pressure.

FIG. 8 graphically illustrates typical data relating cooking pressure to apparent density. In this figure, curve 1 shows the effects of pressures between 1000 and 9000 p.s.i. upon apparent density of a mixture comprising 85% of 200 mesh purified natural flake graphite and 15% of 200 mesh raw petroleum coke. Curve 2 shows the results for a similar mixture containing large graphite flakes (30/40 mesh), and curve 3 shows data for a higher pressure range for a mixture containing the 30/40 mesh flake and a slightly smaller proportion of the petroleum coke, i.e., 92% flake graphite and 8% raw petroleum coke.

It has been found that a higher apparent density can be achieved when the graphite employed contains a substantial ash content, although it will be evident that for many purposes a minimum ash content will be desirable. Thus, with a chemically or otherwise purified graphite, a higher pressure will be needed to achieve a particular desired density than in the case of unpurified graphite. As an example, a test made using a natural lubricating flake graphite having about a 4% ash content yielded a density of 1.97 gms./cm.³, while a comparable test using a chemically purified natural lubricating flake graphite having an ash content less than about 0.5% yielded a product having an apparent density of 1.93 gms./cm.³.

In general, the apparent density of the product will be higher for graphite raw materials having a higher real density. The real densities of the calcined petroleum coke, electric furnace graphite and natural lubricating flake graphite employed as raw material in certain of the preceding examples were of the order of 2.0, 2.15 and 2.2, respectively.

The apparent density is affected by the type of volatile combustible matter containing material used in the mixture. For example, the volatile combustible matter content of the petroleum coke has an important bearing on this. FIG. 7 graphically illustrates data obtained with a given kind of graphite when the type of raw petroleum coke was varied with regard to content of volatile combustible matter. In this figure, curve 1 shows apparent density versus percent volatile combustible matter in the coke for mixtures containing 90% graphite and 10% coke, and curve 2 shows similar data for mixtures containing 85% graphite and 15% coke.

As has been stated before, the apparent density is a maximum with an optimum ratio between graphite and volatile combustible matter containing component of the mixture. This optimum composition is, however, related to other factors, including percentage of volatile combustible matter in the volatile combustible matter containing material, particle size of the graphite or other non-volatile combustible matter containing material, and the pressure applied during cooking. FIG. 9 illustrates the effect of composition of the mix upon the apparent density. All the data in this figure were obtained at 5000 p.s.i. applied pressure. Curve 1 was obtained with purified natural flake graphite screened to pass a 30 mesh and be retained in a 40 mesh screen, combined with a raw petroleum coke containing 14% volatile combustible matter. Curve 2 is for the same material except with the graphite crushed to pass a 200 mesh screen. Curves 3 and 4 are for graphites carefully screened to have the particles in the narrow size range to pass a 200 mesh and be retained in a 270 mesh screen, combined with a special petroleum coke containing 61% volatile combustible matter. Curve 3 is for purified natural flake graphite, and curve 4 is for graphite obtained by decomposition of silicon carbide. It is to be noted that these two graphites are enough alike that the optimum ratio between graphite and coke is the same for both, although the apparent density of the product obtained with the natural graphite is slightly higher under the particular conditions involved.

The various examples set forth above are intended to be illustrative of the process in accordance with the invention, and it should be understood that they do not represent limitations of the process.

Variations in particle size tend to have an effect on the electrical and mechanical properties of the resulting product, although the effect is believed to be less significant in the case of larger articles, i.e., those having a cross-sectional area greater than about 10 square inches. For example, in making a small article (¼" x ¼" x 1½") from a mixture of 80% artificial graphite and 20% bituminous coal, increasing the size of the graphite particles from those which would pass a 325 mesh screen to those which would pass a 70 mesh screen but which would not pass a 100 mesh screen, there was caused a decrease in specific resistivity of from $5.8 \times 10^{-4}$ to $4.3 \times 10^{-4}$ ohm-inches. The test yielding these figures was carried on with a pressure of 3300 p.s.i., while a current of about 560 amps. was passed through the material for 1⅔ minutes followed by a current of 1100 amps. for 2 minutes. This same test resulted in a decrease in compressive strength of from 9700 to 6600 p.s.i. and a decrease in transverse strength of from 5800 to 4600 p.s.i.

The use of smaller particles of the high volatile combustible matter containing component has been found to decrease resistivity, although this effect is not pronounced. The use of small particles tends to increase density, hardness, and compressive and transverse strengths. Thus, with a mixture of 80% artificial graphite (200 mesh) and 20% bituminous coal under 3300 p.s.i. pressure, a mesh size of 30 to 40 for the coal yielded a resistivity of $6.58 \times 10^{-4}$ ohm-inches, a density of 1.71, a compressive strength of 4890 p.s.i., and a transverse strength of 3875 p.s.i., while a mesh size of 325 yielded a resistivity of $5.35 \times 10^{-4}$ ohm-inches, a density of 1.76, a compressive strength of 11,060 p.s.i., and a transverse strength of 7165 p.s.i.

As has been indicated hereinbefore, sugar can be used in place of bituminous coal in the process of the invention. In a cooking cycle using a pressure of 3300 p.s.i. and a current of 560 amps. for 1⅔ minutes and 1100 amps. for 2 minutes in an oven of the type and size employed in connection with Examples I and II, a mixture of 20% cane sugar and 80% 200 mesh electric furnace graphite yielded a product having a resistivity of $4.37 \times 10^{-4}$ ohm-inches, a density of 1.62, a compressive strength of 3120 p.s.i., and a transverse strength of 2490 p.s.i. Other substitutes for bituminous coal are pitch, pulverized wood, cellulose (such as rayon grade wood pulp), and raw petroleum coke. Different materials will require different cooking conditions for best results. The characteristics of the product will vary depending on the materials used.

For easier reference, the results of Examples I to XV given above are reproduced in tabular form below:

| Ex. No. | Block size | Mix Composition | Weight, grams | Transverse strength | Comp.[1] strength | Resistivity | A.D. | Final temp., °F. | Time on power (min.) | Amps. | Pressure (p.s.i.) |
|---|---|---|---|---|---|---|---|---|---|---|---|
| I | ¼ x ¼ x 1½ | 80% 200 mesh furnace graphite, 20% 200 mesh bituminous coal. | 3.5 | 7,660 | 9,480 | .000535 | 1.75 | | 3⅔ | 576–1,182 | 3,330 |
| II | ¼ x ¼ x 1½ | ----do---- | 3.5 | 7,660 | 11,150 | .000435 | 1.767 | | 7⅔ | 560–1,175 | 3,300 |
| III | 4 x 4 x 6 | ----do---- | 2,720 | 6,500 A | 12,550 A | .000692 | 1.726 | 2,020 | 24 | 5,680–6,760 | 2,750 |
| | | | | 5,360 B | 11,800 B | .000607 | 1.732 | | | | |
| | | | | 3,590 C | 9,670 C | .001450 | 1.650 | | | | |
| | | | | 6,320 D | 9,050 D | .000600 | 1.686 | | | | |
| | | | | 4,930 E | 9,560 E | .000692 | 1.630 | | | | |
| | | | | 3,020 F | 9,430 F | .001550 | 1.600 | | | | |
| | | | | Entire bk. ck | | | 1.685 | | | | |
| IV | 4 x 4 x 6 | 92% 200 mesh artificial graphite, 8% 100 mesh hard pitch. | 2,720 | 3,730 A | 6,500 A | .000625 | 1.772 | 1,920 | 52 | | 2,750 |
| | | | | 3,400 B | 5,360 B | .000566 | 1.735 | | | | |
| | | | | 1,340 C | 6,030 C | .001190 | 1.640 | | | | |
| | | | | 2,865 D | 5,700 D | .000658 | 1.690 | | | | |
| | | | | 2,775 E | 5,600 E | .000592 | 1.725 | | | | |
| | | | | Entire block | | | 1.730 | | | | |
| V | 5 x 4 x 2½ | 25% raw petroleum coke—200 mesh (14% vol. combustible content), 75% calcined pet. coke—200 mesh. | 1,400 | 1,840 [2] 2.4 [2] 1.6 | 4,790 | .00260 [3] .00063 | 1.55 | | 45 | 1,770–8,240 | 2,700 |
| VI | | 40% elec. furnace graphite—200 mesh, 35% calcined pet. coke—200 mesh, 25% bituminous coal—200 mesh. | 3.5 | 8,040 | 15,500 | .00078 | 1.75 | | 12 | 424–1,133 | 3,300 |
| VII | .4 x .4 x .4 | 65% calcined pet. coke; 1–50 microns, 35% bituminous coal 1–50 microns. | 2.5 | ------ [4] 72 | 26,400 | | [5] 1.725 | | 7 | 320–1,060 | 11,00 9,00 |
| | | 70% calcined pet. coke; 1–50 microns, 30% bituminous coal 1–50 microns. | | | | | ([6]) | | | | 7,350 |
| | 3 inch diameter. | 78% calcined pet. coke—325 mesh, 22% bituminous coal—325 mesh. | | 8,600 [4] 62 | 16,080 | .00187 | [5] 1.78 | 1,800 | 1 | 1,000/in.[2] | 5,000 5,000 |
| VIII | ¼ x ¼ x 1½ | 70% elec. furnace graphite—200 mesh, 30% "Jucaro" sawdust—100 mesh. | 3.6 | 4,530 | 7,700 | .000508 | 1.62 | | 7⅔ | 544–960 | 3,300 |
| IX | | 80% elec. furnace graphite—200 mesh, 20% pet. coke (raw)—200 mesh (36% vol. combustible). | 3.5 | 7,060 | 6,840 | .000428 | 1.72 | | 7⅔ | 560–1,164 | 3,310 |
| X | .4 x .4 x .4 | 85% elec. furnace graphite—200/270 mesh, 15% raw pet. coke (40% vol. matter)—200 mesh. | 2.5 | ------ [3] 40 | | | 1.925 | | 7 | 340–1,040 | 11,000 |
| XI | ¼ x ¼ x 1½ | 92% nat. lub. flake graphite—30/40 mesh <.1% ash, 8% raw pet. coke—200 mesh (14.6% vol.). | 3.6 | 1,590 | | .000808 | 2.087 | | 9 | 560–1,076 | 5,000 |
| | | 85% nat. lub. flake graphite—30/40 mesh, 15% raw pet. coke—200 mesh (14.6% vol.). | 3.6 | 1,540 | | .000863 | 2.026 | | | | |
| | | 94% nat. graphite, 6% fuel oil. | | 750 | | | 2.068 | | | | |

See footnotes at end of table.

| Ex. No. | Block size | Mix Composition | Weight, grams | Transverse strength | Comp.[1] strength | Resistivity | A.D. | Final temp., °F. | Time on power (min.) | Amps. | Pressure (p.s.i.) |
|---|---|---|---|---|---|---|---|---|---|---|---|
| XII | ¼ x ¼ x 1½ | 90% nat. lub. flake graphite—200/270 mesh, 10% spec. raw pet. coke—200 mesh (61% vol. comb. matter). | 3.7 | 3,175 | 1,635 | .0001725 | 2.018 | | 9 | 600–1,180 | 5,000 |
| | | 85% nat. lub. flake graphite—200/270 mesh, 15% spec. raw pet. coke—200 mesh (14.6% vol. comb. matter). | 3.8 | 2,640 | | .000237 | 1.935 | | | | 5,000 |
| | | 90% skeleton graphite from SiC—200/270 mesh, 10% spec. raw coke—200 mesh (61% vol. comb.). | | 3,680 | 3,170 | .0002268 | 1.98 | | | | 5,000 |
| XIII | 5 x 4 (L x W) | 90% nat. flake graphite, 10% raw pet. coke (14% vol.)—200 mesh. | 700 | | | | 2.005 | | 45 | 1,900–5,690 | 2,700 |
| XIV | ¼ x ¼ x 1½ | 92.5% chemically purified nat. flake graphite—30/40 mesh, 7.5% raw pet. coke—200 mesh (41% vol. comb. content). | 3.8 | 2,110 | | .0000706 | 2.077 | | | 568–1,107 | 5,000 |
| XV | ¼ x ¼ x 1½ | 70% nat. flake graphite—30/40 mesh, 20% nat. flake graphite—200 mesh, 10% bituminous coal—200 mesh. | 3.8 | 3,820 | | .00 0875 | 2.055 | | 10 | 596–1,124 | 5,000 |
| | ¼ x ¼ x 1½ | 80% elec. furnace graphite—200 mesh, 20% cane sugar. | | 2,490 | 3,120 | .000437 | 1.62 | | 3⅔ | 560–1,100 | 3,300 |

[1] Pounds per inch.[2] Suffix letters indicate orientation of sample. (See FIGURE 6.)
[2] CTE×10[6].
[3] After graphitization to 3,000° C.
[4] Hardness as measured with a Sklerograf tester. (Supplied by the Kurt Orban Company, New York City.)
[5] Cracked.
[6] Product OK.

Useful products may be produced from mixtures consisting of combinations of graphite and bituminous coal or from other constituents as described above. Where the process is properly conducted, and with certain combinations of materials, the resultant products may have an electrical conductivity equal to or better than commercial electrode grade graphite while at the same time having compressive and transverse strengths higher than commercial electrode graphite. Such products may have an evident hardness greater than that of commercial graphite electrodes. These products are generally characterized by a density greater than that of commercial electrode graphite, although useful products of lower density can be made with a sacrifice in other properties. The preferred mechanically strong-electrically conductive product produced in accordance with the process of the invention will exhibit a resistivity lower than about $10 \times 10^{-4}$ ohm-inches and transverse and compressive strengths each greater than about 5000 p.s.i. The preferred low resistivity product produced in accordance with the process of the invention will exhibit a resistivity lower than about $3 \times 10^{-4}$ ohm-inches.

As described previously, the process of the invention may be used to produce a very high density product, i.e., a product having an apparent density greater than about 1.8 gms./cm.$^3$ and higher than 2.0 gms./cm.$^3$.

The process may also be used to make hard and strong products suitable for seal rings and the like, and it may be used to produce products with interesting combinations of strength, hardness, and frictional characteristics by suitable selection of the materials and conditions. Very fine particle size and careful intermixing of the ingredients have been found particularly beneficial in the production of hard, strong articles by the process. By using such very fine materials in a size range of one to 50 microns, it is possible to produce hard, strong products without the use of extreme pressures. Thus a pressure of 3000 p.s.i. has been used successfully to produce a product of hardness comparable to the hardest commercial grades of specialty carbon for seal rings and the like.

The term "formed carbon article" as used in the specification and claims herein refers to "baked" articles as distinguished from the so-called "green" carbons of the carbon industry. Such green carbons usually contain carbon bonded together by a carbonaceous material such as pitch, whereas the present invention is concerned with articles which have been baked, i.e., heated sufficiently that any such carbon binder has been substantially completely decomposed. The term "carbon" as used herein, except where distinguished from graphite, is intended to include carbon in any of its elemental forms, including carbon black and graphite. The term "wholly carbonaceous" as used herein means one in which the primary body material as well as the material which bonds the whole together are both elemental carbon.

The process of the invention may also be operated with non-carbonaceous materials being added to the otherwise normal mixture of carbonaceous materials. Such non-carbonaceous materials are not employed as bonding agents and are not in any sense essential to the formation of the product but are only additives employed to alter the characteristics of the product. For example, particles of mica have been added to the particles of carbonaceous material to be treated in accordance with the process of the invention to yield a refractory material having better heat insulating characteristics than would be realized without the addition of the mica. Similarly, particles of copper have been added to yield increased conductivity such as would be desirable for certain types of brushes. Particles of tungsten have also been added. A variety of other such additives will be apparent.

Another important characteristic of the product of the invention resides in the substantial freedom from cracks and voids.

A modification of the process of the invention, which has been used in making small samples, consists of placing a small piece of hardwood in the oven mold and surrounding it with comminuted graphite particles. When heated at a rapid rate the hardwood disintegrates and the product is a hard mass with a void at the place where the piece of hardwood was located.

An important feature of the material of the invention lies in the dimensional accuracy with which articles may be formed. By properly selecting the amount and constituents of the oven charge and by properly selecting the process conditions, formed articles having quite exact dimensions can be made.

If desired, a very low ash content product can be made. For this purpose, preferably very low ash content raw materials should be employed. For example, purified electric furnace or natural graphite may be mixed with low ash content coal or some other material having a very low ash content such as sugar or petroleum coke.

A very important aspect of the invention resides in the production of a wholly carbonaceous bonded article having appreciable strength, a density higher than about 1.8 gms./cm.$^3$ (and even higher than about 2.0 gms./cm.$^3$) and a resistivity lower than about $2.2 \times 10^{-4}$ ohm-inches. It is believed that a density above about 2.0 gm./cm.$^3$ has not heretofore been achieved without costly and undesirable multiple impregnation operations. Such multiple impregnation operations are not believed capable of producing an article having a density of more than about 1.92 gms./cm.$^3$. It is also believed that a resistivity lower than about $2.2 \times 10^{-4}$ ohm-inches has not heretofore been achieved in a wholly carbonaceous bonded article. However, in accordance with the invention, these characteristics can be secured without impregnation and hence are achieved in a wholly carbonaceous article. For this purpose, it is preferred to use a substantial proportion of natural graphite, and preferably natural lubricating flake graphite.

While natural graphite, and particularly natural lubricating flake graphite, is admirably suited to the production of a high density bonded article, other forms of graphite can also be advantageously used provided they exhibit suitable lubricity characteristics. An example of such a form of graphite is a synthetic graphite resulting from thermal decomposition of silicon carbide.

The process of the invention is also suited to the manufacture in one step of articles, such as electric motor brushes, in which a metal element is molded to the carbon. In such case, the metal is inserted in the mix and becomes bonded to the article.

As mentioned previously, an article produced by the method of the invention and having an apparent density of the same order as that of a similar article produced from similar material by prior art processes will have a permeability to gas of from 1/5 to as little as 1/40 of that of the article produced by prior art processes. An example of such a prior art process has been set forth hereinbefore and may involve the formation of a green article and the slow baking of the green article in a gas-fired furnace followed by slow cooling in the furnace. The whole furnace time may be about 15 to 50 days, with the greater portion required for heating. The permeability of the resultant product of such a prior art process is 5 to 40 times greater than the permeability of a product produced in accordance with the method of the invention. This permeability comparison is based on the use of the same or similar constituents in substantially the same particle sizes in the prior art process and in the method of the invention and also in apparent densities of the same order of magnitude. While the constituents should be the same or similar, the relative proportions can be varied to achieve optimum results for both the prior art process and that of the invention, and in general will not be the same.

The great decrease in product permeability by using the process of the invention is demonstrated in the following table of test results:

| Materials | Preparation | Forming | Size | Weight, gms. | A.D. | Permeability in milli-Darcy's | | Flexural strength p.s.i. with grain | Specific resistivity ohms/in./sq. in. with grain |
| | | | | | | With grain | Across grain | | |
| --- | --- | --- | --- | --- | --- | --- | --- | --- | --- |
| (A) 19.2% of 100° C M.P. coal tar pitch—80.8% of blend of manufactured graphite flour (46%) and particles (46%) and carbon black (8%). | Conventional | Conventional molding, conventional baking | 9″ x 4½″ x 2½″ | 2,750 | 1.67 | 263 | 173 | | |
| (B) 13% of milled 175° C. M.P. coal tar pitch—87% of dry material blend shown in (A). | Dry blending at room temperature. | By invention 90 sec. bake to 1,000° C. | 9″ x 4½″ x 2½″ | 2,850 | 1.74 | 2.1 | 0.8 | | |
| (C) 23.6% of 100° C. M.P. coal tar pitch—76.4% of blend of calcined anthracite coal particles (50%) and graphitized metallurgical coke flour (50%). | Conventional | Conventional extrusion, conventional baking. | 13½″ x 6″ x 3″ | 6,400 | 1.61 | 661 | 150 | 1,570 | .0012 |
| (D) 15% of milled bituminous coal with 36% volatile 85% of dry blend shown in (C). | Dry blending at room temperature. | By invention 135 sec. bake to 1,000° C. | 13″ x 6″ x 3″ | 6,200 | 1.62 | 8 | 6 | 1,300 | .0012 |
| (E) 23.6% of 100° C. M.P. coal tar pitch—76.4% of a blend of calcined petroleum coke flour (75%) and particles (25%). | Conventional | Conventional extrusion and baking. | 9″ x 4½″ x 2½″ | 2,550 | 1.55 | 280 | 108 | 2,400 | .0017 |
| (F) 25% of uncalcined petroleum coke (13% volatile) 75% of blend shown in (E). | Dry blending at room temperature. | By invention 105 sec. to 1,000° C. | 9″ x 4½″ x 2½″ | 2,540 | 1.55 | 13 | 10 | 2,300 | .0018 |

| Materials | Preparation | Forming | Size | Weight, gms. | A.D. | Permeability in milli-Darcy's | | Flexural strength p.s.i. with grain | Specific resistivity ohms/in./sq. in. with grain |
|---|---|---|---|---|---|---|---|---|---|
| | | | | | | With grain | Across grain | | |
| (G) Same as (E) | Same as (E) | Same as (E). Then impregnated with coal tar pitch and graphitized to 2,800° C. | 9″ x 4½″ x 2½″ | ¹ 2,700 | 1.735 | 36.2 | | | |
| (H) Same as (F) | Same as (F) | Same as (F). Then impregnated with coal tar pitch and graphitized to 2,800° C. | 9″ x 4½″ x 2½″ | ¹ 2,700 | 1.737 | 3.5 | 1.1 | | |
| (I) 23.6% 100° C. M.P. coal tar pitch—76.4% of a blend of petroleum coke flour (50%) and particles (50%). | Conventional | Same as (G) | 9″ x 4½″ x 2½″ | ¹ 2,600 | 1.69 | 538 | 201 | 1,950 | .0039 |
| (J) 13% of 175° C. M.P. coal tar pitch 87% of blend shown in (I). | Dry blending at room temperature. | Same as (H) | 9″ x 4½″ x 2½″ | ¹ 2,600 | 1.69 | 1.5 | | 1,953 | .0032 |
| (K) Same as (J) | Mix at 200° C., cool to room temperature. | ...do... | 9″ x 4½″ x 2½″ | 2,600 | 1.71 | 1.3 | | 2,000 | .0032 |

¹ Before pitch impregnation.

Tests A, C, E, G and I represent conventional processing, while test B, D, F, H, J and K represent the process of the invention and show that the process of the invention results in a far lower permeability than the conventional gas baking processes. The range of ⅕ to ¹⁄₄₀ mentioned previously for permeability comparison is based on a large number of tests, only a few of which are reported in the foregoing tabulation. In some cases a permeability of much less than ¹⁄₄₀ was achieved for the process of the invention, although in most cases the permeability differential was in the range of ⅕ to ¹⁄₄₀.

While the invention has been described in connection with specific examples thereof, it should be understood that it is not limited thereto and that various modifications thereof will occur to those skilled in the art without departing from the spirit and scope of the invention as set forth in the appended claims.

I claim:

1. A process for making a formed carbon article from comminuted particles of carbonaceous raw material including a first carbonaceous material which is fusible and which decomposes to form an appreciable amount of fixed carbon and contains appreciable volatile combustible matter and a second carbonaceous material having a low volatile matter content, comprising the steps of placing the comminuted particles of carbonaceous raw material in a mold, subjecting the material within the mold to a high mechanical pressure not less than about 1000 p.s.i. to compress the same, and rapidly heating the material in the mold while maintaining said pressure thereon by passing an electrical current through said compressed material so that the heat is generated within the raw material itself, said heating step and said pressure maintenance being continued until said fusible carbonaceous material is carbonized.

2. A process for producing an electrically conductive formed carbon article exhibiting substantial mechanical strength, comprising the steps of forming a non-coherent mix comprising comminuted particles of a first carbonaceous material having a low volatile matter content and comminuted particles of a second carbonaceous material which is fusible and which decomposes when heated to form an appreciable amount of fixed carbon and contains appreciable volatile combustible matter, enclosing the mix within a mold, subjecting the mix within the mold to a high mechanical pressure not less than about 1,000 p.s.i. to compress the same, and rapidly heating the compressed mixture while maintaining said pressure thereon to a temperature at least sufficient to cause substantially complete thermal decomposition of said second carbonaceous material, said heating step being effected by passing an electrical current through said compressed mixture so that the heat is generated within the material itself.

3. A process for producing an electrically conductive formed carbon article exhibiting substantial mechanical strength, comprising the steps of forming a mix comprising comminuted particles of a first carbonaceous material having a low volatile matter content and comminuted particles of a second carbonaceous material which is fusible, which decomposes to form at least some fixed carbon when heated and which contains appreciable volatile combustible matter, enclosing the mix within a mold, subjecting the mix within the mold to a high mechanical pressure not less than about 1,000 p.s.i. to compress the same, rapidly heating the compressed mixture while maintaining said pressure thereon to a first temperature at least sufficient for substantially complete thermal decomposition of said second carbonaceous material to occur, said heating step being effected by passing an electrical current through said compressed mixture so that the heat is generated within the material itself, and then further heating the article to a temperature higher than said first temperature to further reduce the resistivity thereof.

4. A process for producing an electrically conductive formed carbon article exhibiting substantial mechanical strength, comprising the steps of forming an electrically conductive mix comprising, in major propostion, a first carbonaceous material having a low volatile matter content and, in a minor proportion, a second carbonaceous material which is fusible, which is capable of decomposing when heated to form at least some fixed carbon and which contains appreciable volatile combustible matter, enclosing the mix, in unheated condition within a mold, subjecting the mix within the mold to a high mechanical pressure not less than about 1,000 p.s.i. to compress the same, and passing an electrical current through the compressed mixture to heat the same to a temperature at least sufficient to volatilize the volatile matter content of the second carbonaceous material and to carbonize said fusible carbonaceous material, said pressure being maintained on said mixture throughout said heating step, the density of said electrical current being sufficiently high relative to the mass of said mix so that the temperature rise of said compressed mixture occurs at a rapid rate, said rate being not less than about 2° C. per minute for very large mix masses and being substantially higher for smaller mix masses.

5. A process for producing an electrically conductive formed carbon article exhibiting substantial mechanical strength, comprising the steps of forming a mix comprising comminuted particles of a first carbonaceous material having a low volatile matter content and comminuted particles of a second carbonaceous material which is fusible and which decomposes when heated to form an appreciable amount of fixed carbon and which contains appreciable volatile combustible matter, enclosing the mix within a mold, subjecting the mix within the mold to a high mechanic pressure not less than about 1000 p.s.i. to compress the same; passing a first electrical current through the compressed mixture while maintaining said pressure thereon to heat the same to a first temperature at which at least a major portion of the shrinkage of said mix has taken place, the density of said first electrical current being sufficiently high so that the temperature rise of said compressed mixture occurs at a rapid rate, and then passing a second electrical current through said compressed mix while maintaining said pressure thereon, said second electrical current having a density greater than the density of said first electrical current.

6. A process for making a formed carbon article from an electrically conductive mix consisting primarily of comminuted particles of graphite and the remainder of a carbonaceous material which is fusible, which decomposes when heated to form an appreciable amount of fixed carbon and which contains appreciable volatile combustible matter, comprising the steps of placing the mix in a mold, subjecting the mix within the mold to a high mechanical pressure not less than about 1000 p.s.i. to compress the same, and passing an electrical current through the mix in the mold while maintaining said pressure thereon to heat the same at least to a temperature at which substantially complete bonding of the material in the mold occurs and at which substantial evolution of volatile matter is complete, said last mentioned step being carried out so that the temperature rise of the material in the mold takes place at a rapid rate at least during a substantial portion of the heating step and whereby said last mentioned step is complete in a time interval less than about one hour.

7. A process for making a formed carbon article having an electrical resistivity lower than about $3\times10^{-4}$ ohm-inches from comminuted particles of carbonaceous raw material including about 85 to 95% of a high lubricity graphite and about 5 to 15% of another carbonaceous material which is fusible, which decomposes when heated to form an appreciable amount of fixed carbon and which contains appreciable volatile combustible matter, comprising the steps of placing the comminuted particles of carbonaceous raw material in a mold, subjecting the material within the mold to a high mechanical pressure not less than about 1000 p.s.i. to compress the same, passing a high density electrical current through the material in the mold while maintaining said pressure thereon to heat the same at least to a temperature at which substantial evolution of said volatile combustible matter is complete and at which substantially complete bonding of said carbonaceous materials has occurred, said heating step being carried out so that the temperature rise of the materials in the mold takes place at a rapid rate at least during a substantial portion of the heating step and whereby said heating step is complete in a time interval less than about one hour.

8. A process as set forth in claim 7 in which said graphite is a natural lubricating flake graphite.

9. A process for producing a baked unimpregnated substantially wholly carbonaceous bonded article having an apparent density greater than about 2.0 gms./cm.$^3$, comprising the steps of forming an electrically conductive mix comprising predominantly particles of graphite and in lesser part particles of a carbonaceous substance which is fusible, which decomposes when heated to form an appreciable amount of fixed carbon and which contains appreciable volatile combustible matter, subjecting the mix to a high mechanical pressure not less than about 1000 p.s.i. to compress the same, and rapidly heating the mix while maintaining said pressure thereon at least to a temperature at which substantial evolution of said volatile combustible matter is complete, said heating step being carried out by passing a high density electrical current through the mix itself, said high mechanical pressure and the rate of rise of temperature of said mix being sufficiently great so that the resultant bonded article exhibits an apparent density greater than about 2.0 gms./cm.$^3$.

10. A process as set forth in claim 9 in which said graphite is a natural lubricating flake graphite and in which said pressure is of the order of 4500 p.s.i.

11. A process for making a formed carbon article from an electrically conductive mix formed predominantly from particles of an electrically conductive carbonaceous material having a low volatile matter content and in lesser part from a second carbonaceous material which contains appreciable volatile combustible matter and which is susceptible of thermal decomposition to form at least some fixed carbon, comprising the steps of placing the mix in a mold, subjecting the mix within the mold to a high mechanical pressure not less than about 1000 p.s.i. to compress the same, and rapidly heating the mix in the mold while maintaining said pressure thereon by passing a high density electrical current therethrough, said heating step being continued at least until substantially complete thermal decomposition of the second carbonaceous material occurs, the magnitude of said electrical current being sufficient relative to the mass of said mix so that the rate of temperature rise of said mix is at least about 2° C. per minute for very large mix masses and is substantially higher for smaller mix masses.

12. A process as set forth in claim 11 in which said electrically conductive carbonaceous material is graphite.

13. A process as set forth in claim 11 in which said electrically conductive carbonaceous material is calcined petroleum coke.

14. A process as set forth in claim 11 in which said second carbonaceous material is bituminous coal.

15. A process as set forth in claim 11 in which said second carbonaceous material is raw petroleum coke.

16. A process as set forth in claim 11 in which said second carbonaceous material is a heavy fuel oil.

17. A process as set forth in claim 11 in which said electrically conductive carbonaceous material and said second carbonaceous material are calcined and raw petroleum coke, respectively.

References Cited in the file of this patent

UNITED STATES PATENTS

| | | |
|---|---|---|
| 1,714,165 | Gilbert | May 21, 1929 |
| 1,837,770 | Gilbert | Dec. 22, 1931 |
| 1,840,491 | Diefsche | Jan. 12, 1932 |
| 1,982,821 | Marsden et al. | Dec. 4, 1934 |
| 2,310,108 | Moberly | Feb. 2, 1943 |
| 2,502,183 | Swallen | Mar. 28, 1950 |
| 2,529,041 | Muller | Nov. 7, 1950 |
| 2,682,686 | Mrozowski | July 6, 1954 |
| 2,728,109 | Bonnot | Dec. 27, 1955 |

FOREIGN PATENTS

| | | |
|---|---|---|
| 3,757 | Great Britain | of 1882 |

UNITED STATES PATENT OFFICE
CERTIFICATE OF CORRECTION

Patent No. 3,001,237                              September 26, 1961

Rodolfo Rodriguez Balaguer

It is hereby certified that error appears in the above numbered patent requiring correction and that the said Letters Patent should read as corrected below.

Column 2, line 30, for "ardinary" read -- ordinary --; column 6, line 14, for "not withstanding" read -- notwithstanding --; lines 43 and 44, for "coking", each occurrence, read -- cooking --; column 7, line 6, for "form" read -- from --; line 7, for "lower" read -- low --; same column 7, line 11, for "temepratures" read -- temperatures --; column 8, line 42, after "all" insert -- of --; column 10, line 18, for "block" read -- blocks --; column 11, line 3, for "differentiation" read -- differential --; column 13, line 38, for "articficial" read -- artificial --; line 66, for "consistent" read -- inconsistent --; same column 13, line 69, for "coke" read -- cook -- column 14, line 7, for "apparaent" read -- apparent --; column 15, line 72, for "charts" read -- chart --; column 19, line 66, for "cracks," read -- cracks. --; column 20, line 58, for "lock read -- block --; line 67, for "pas" read -- pass --; columns 27 and 28, in the table, column 12, line 7 thereof, for "11,OO" read -- 11,000 --; same table, column 12, line 8 thereof, for "9,OO" read -- 9,000 --; same table, column 6, line 20 thereof, for "16,080" read -- 16,800 --; same table, column 5, line 24 thereof, for the footnote numeral "3" read -- 4 --; columns 29 and 30, in the table, column 7, line 6 thereof, for ".00 0875" read -- .0000875 --; column 34, line 56, for "propostion" read -- proportion --; line 58, strike out "a", first occurrence; column 35, line 13, for "mechanic" read -- mechanical --.

Signed and sealed this 24th day of April 1962.

(SEAL)
Attest:

ESTON G. JOHNSON                                  DAVID L. LADD
Attesting Officer                                      Commissioner of Patents